US012698230B2

(12) United States Patent
Kirkman et al.

(10) Patent No.: US 12,698,230 B2
(45) Date of Patent: Aug. 4, 2026

(54) MOLTEN GLASS TRANSPORTER

(71) Applicant: Owens-Brockway Glass Container Inc., Perrysburg, OH (US)

(72) Inventors: Thomas Kirkman, Perrysburg, OH (US); Stephen M. Graff, Maumee, OH (US); Karl Johnston, Perrysburg, OH (US); Jason Pickles, Adrian, MI (US); Charles Obee, Monclova, OH (US); Brian Brozell, Maumee, OH (US)

(73) Assignee: Owens-Brockway Glass Container Inc., Perrysburg, OH (US)

( * ) Notice: Subject to any disclaimer, the term of this patent is extended or adjusted under 35 U.S.C. 154(b) by 209 days.

(21) Appl. No.: 18/455,604

(22) Filed: Aug. 24, 2023

(65) Prior Publication Data

US 2025/0066237 A1     Feb. 27, 2025

(51) Int. Cl.
*C03B 7/14*          (2006.01)

(52) U.S. Cl.
CPC ..................................... *C03B 7/14* (2013.01)

(58) Field of Classification Search
None
See application file for complete search history.

(56) References Cited

U.S. PATENT DOCUMENTS

| | | | |
|---|---|---|---|
| 1,413,788 A | 4/1922 | Rule | |
| 1,415,824 A * | 5/1922 | Ferngren | C03B 7/14 |
| | | | 65/129 |
| 1,484,907 A | 2/1924 | Schram | |
| 1,552,497 A | 9/1925 | Noble | |

| | | | |
|---|---|---|---|
| 1,608,326 A | 11/1926 | Lawson | |
| 1,712,327 A | 5/1929 | Brooke et al. | |
| 1,845,491 A * | 2/1932 | Eckert | C03B 7/08 |
| | | | 65/223 |
| 1,853,002 A | 4/1932 | Howard | |
| 2,147,307 A | 2/1939 | McNamara et al. | |
| 8,056,364 B2 | 11/2011 | Sakai et al. | |
| 8,091,387 B2 | 1/2012 | Iguchi et al. | |
| 10,737,963 B2 | 8/2020 | Suzuki et al. | |
| 11,492,283 B2 | 11/2022 | Suzuki et al. | |
| 2004/0182112 A1 * | 9/2004 | Hosoe | C03B 19/1055 |
| | | | 65/29.21 |
| 2008/0110207 A1 | 5/2008 | Fukuda et al. | |
| 2009/0107181 A1 | 4/2009 | Sakai | |
| 2012/0011890 A1 | 1/2012 | Sakai et al. | |
| 2023/0097028 A1 | 3/2023 | Flynn et al. | |
| 2023/0271869 A1 | 8/2023 | Graff et al. | |
| 2023/0271870 A1 | 8/2023 | Graff et al. | |

FOREIGN PATENT DOCUMENTS

CN          213570121 U          6/2021

OTHER PUBLICATIONS

CZ 294022 machine translation, Difrank Frank, Method for Supporting Glass Delivery Tube Means, Sep. 2004 (Year: 2004).*
PCT International Search Report and Written Opinion, Application No. PCT/US2024/040840, Filing Date Aug. 2, 2024, dated Nov. 7, 2024.

* cited by examiner

*Primary Examiner* — Queenie S Dehghan

(57)          ABSTRACT

A molten glass transporter includes a carriage frame including upper and lower sides, and a transport cup carried by the carriage frame and including a conduit including an inlet disposed at the upper side of the carriage frame, and an endcap disposed at the lower side of the carriage frame below an outlet end of the conduit. A related method is also disclosed.

27 Claims, 18 Drawing Sheets

MOLTEN GLASS TRANSPORTER

TECHNICAL FIELD

This patent application discloses innovations related to apparatuses and methods for glass container manufacturing and, more particularly, apparatuses and methods for transporting molten glass from one location, such as from a glass feeder, to another location, such as to a glass container forming machine.

BACKGROUND

Glass container manufacturing processes typically include the following general process steps: (a) melting raw materials in a glass furnace or melter to produce molten glass; (b) producing a discrete portion or charge of the molten glass, sometimes referred to as a "glass gob," by flowing a stream of the molten glass out of a gob feeder and cutting the stream to produce the molten glass gob; (c) delivering the molten glass gob to a blank mold of a glass container forming machine that forms the molten glass gob into a "parison" or a partially-formed container; (d) opening the blank mold and transferring the parison to a blow mold of the glass container forming machine; and (e) blowing the parison against internal walls of the blow mold to form a glass container. In conventional processes, the molten glass gobs are delivered from the glass feeder to their respective blank molds by gob delivery equipment that includes a lengthy and widespread series of distributor funnels and scoops, troughs, and deflectors. Because the gob delivery equipment is required to be disposed at a minimum angle to convey glass gobs at a desired velocity, the gob delivery equipment can be relatively tall, often extending between ten and fourteen feet in height.

Conventional gob delivery equipment is quite useful and dependable in many circumstances. However, conventional gob delivery equipment imparts some asymmetric thermal and shape distortion to the gob. More specifically, as the glass gob travels along lubricated metal-based delivery components, the longitudinal surface portion of the gob that is in sliding contact with the delivery components loses heat to those components and, as a result, becomes colder and stiffer than the rest of the surface of the gob. As such, the glass gob typically exhibits an inhomogeneous temperature profile around its circumference when it is delivered to the blank mold and may also have a varying shape due to being non-uniformly elongated along the delivery system components. For these reasons, the molten glass gob usually deforms and flows irregularly within the blank mold when being formed into a parison, which can lead to glass containers having an inconsistent wall thickness. The amount of glass included in each molten glass gob is engineered to account for this wall thickness disparity; that is, extra glass is included in the glass gob so the even the thinnest portion of the glass container wall will meet or exceed a minimum threshold thickness, even though other portions of the container wall may be much thicker than necessary. If this distortion in glass wall thickness did not occur, the weight of the container could be reduced, without reducing minimum glass wall thickness specifications, since the reduction would serve to remove excess glass.

SUMMARY OF THE DISCLOSURE

The present disclosure embodies a number of aspects that can be implemented separately from or in combination with each other.

An embodiment of a molten glass transporter includes a carriage frame including upper and lower sides and a transport cup carried by the carriage frame. The transport cup includes a conduit including an inlet end having an inlet and an outlet end having an outlet wherein the inlet is disposed at the upper side of the carriage frame, and an endcap disposed at the lower side of the carriage frame below the outlet end of the conduit.

Another embodiment of a molten glass transporter includes a carriage frame including upper and lower sides and having a base, and a conduit bracket releasably coupled to the base of the carriage frame. The molten glass transporter also includes one or more transport cups carried by the carriage frame, and including one or more conduits carried by the conduit bracket and including one or more inlet ends having one or more inlets and one or more outlet ends having one or more outlets, and one or more endcaps disposed at the lower side of the carriage frame below the one or more outlet ends of the one or more transport cups.

A further embodiment of a molten glass transporter includes a carriage frame and a plurality of transport cups carried by the carriage frame and including a plurality of conduits, and a plurality of endcaps disposed below the conduits. The molten glass transporter also includes an endcap carrier carrying the plurality of endcaps and movable to simultaneously move all endcaps of the plurality of endcaps to simultaneously open and close all transport cups of the plurality of transport cups.

An additional embodiment of a molten glass transporter includes a carriage frame including upper and lower sides, and a transport cup carried by the carriage frame, and including a conduit including an inlet end having an inlet and an outlet end having an outlet wherein the inlet is disposed at the upper side of the carriage frame, and an endcap disposed at the lower side of the carriage frame below the outlet end of the conduit. The molten glass transporter also includes a plurality of controls carried by the carriage frame at the lower side of the carriage frame to control supply of fluid to the endcap and to the conduit.

An embodiment of a method of transporting molten glass includes providing a molten glass transporter including a carriage frame, a plurality of transport cups carried by the carriage frame and having a plurality of conduits and a plurality of endcaps below the plurality of conduits, removing the plurality of endcaps from the carriage frame and replacing the plurality of endcaps with a plurality of replacement endcaps having a quantity different than that of the plurality of endcaps, and removing the plurality of conduits from the carriage frame and replacing the plurality of conduits with a plurality of replacement conduits having a quantity different than that of the plurality of conduits.

DETAILED DESCRIPTION

Figure 1:
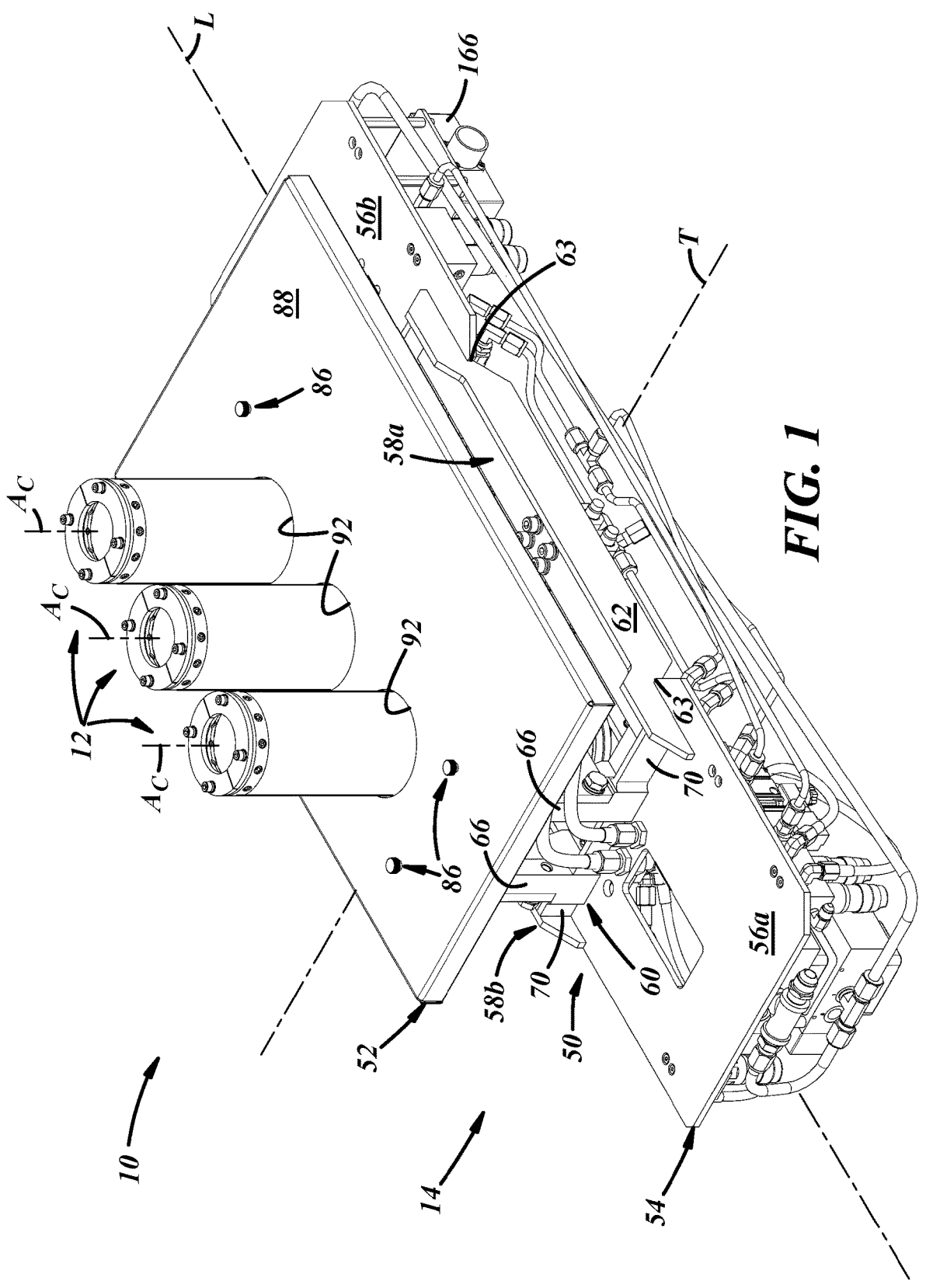
FIG. 1 is an upper perspective view of a molten glass transporter in accordance with an illustrative embodiment of the present disclosure, and illustrating a carriage including a carriage frame, and three transport cups carried by the carriage.

A molten glass transporter is disclosed that transports molten glass charges from a location beneath a molten glass feeder, for example, to another location such as above a blank molding station of a glass forming machine. The transporter includes a molten glass transport cup including a transport guide in the form of a conduit and a closure in the form of an endcap disposed below the conduit. The conduit may be externally cooled with a first gas that cools the conduit and also permeates through the conduit to displace the received molten glass charge away from the conduit, and a second gas also may be supplied through the endcap to fluidly displace the molten glass charge away from the endcap. Structural details and corresponding descriptions of the presently disclosed molten glass transport cup, as well as variations thereof, are disclosed in U.S. application Ser. Nos. 18/113,925 and 18/113,754, filed on Feb. 24, 2023, each of which is assigned to the assignee of this application and is hereby incorporated by reference in its entirety.

In the presently disclosed transporter, the transport cup may be carried by a carriage frame, such that an inlet of the transport cup conduit is disposed at an upper side of the carriage frame, and the endcap is disposed at a lower side of the carriage frame below an outlet of the conduit. The carriage frame may include a conduit bracket releasably coupled to a base of the carriage frame, and one or more conduits may be carried by the conduit bracket. Additionally, the transporter may include an endcap carrier carrying a plurality of endcaps and movable to simultaneously move all of the endcaps to simultaneously open and close all of the conduits of the plurality of transport cups. The transporter may also include a plurality of controls carried by the carriage frame at the lower side of the carriage frame to control the supply of gases to the endcap and to the conduit.

With reference now to FIGS. 1-5, an example embodiment of a molten glass transporter 10 includes three molten glass transport cups 12, and a cup carriage 14 to carry the transport cups 12, which may be arranged in a line. The transport cups 12 have transport cup axes $A_C$, and the cup carriage 14 has a longitudinal axis L extending along the line of transport cups 12 and a lateral or transverse axis T that is transverse with respect to the longitudinal axis L and that may intersect the transport cup axis $A_C$ of a center one of the transport cups 12. The transporter 10 is used to transport discrete portions or charges of molten glass, referred to herein as molten glass charges (not shown), from a loading position such as below a glass feeder (not shown) to an unloading position such as, for example, above three corresponding blank molds (not shown) located in any suitable location relative to the glass feeder, including at elevations above, below, or level with the feeder. Although not illustrated, the glass feeder may include three corresponding feeder orifices that dispense molten glass streams and shears, lasers, or the like that separate the molten glass streams into the discrete charges of molten glass.

The transporter 10 may be translated, rotated, pivoted, swung, articulated, and/or moved in any other manner suitable for transporting molten glass charges between loading and unloading positions. In one particular implementation, the transporter 10 is translated along a linear path back-and-forth between the loading and unloading positions without being inverted. Additionally, and although not illustrated, a robot, a gantry, rodless cylinder, or any other suitable transporter mover may be used to move the transporter 10 between its loading and unloading positions. Preferably, however, and as will be described in further detail below, the transporter 10 is configured to be translated along and between rails, for example, rails of a gantry as disclosed in U.S. application Ser. No. 18/455,599, filed on Aug. 24, 2023, the entire contents of which is incorporated herein by reference.

Figure 5:
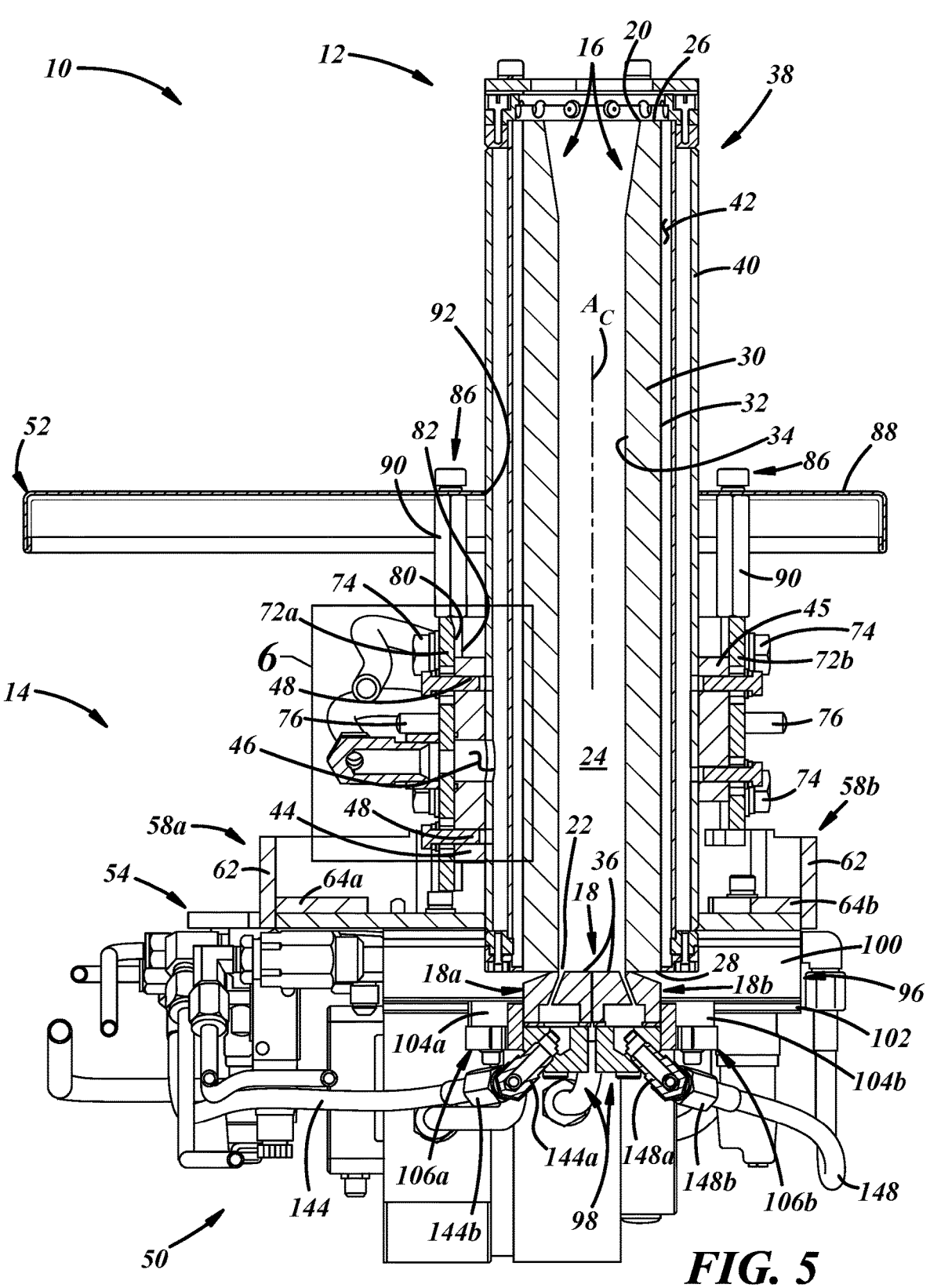
FIG. 5 is a cross-sectional end view of the molten glass transporter of FIG. 1, taken along line 5-5 of FIG. 4, and additionally illustrating a transport cup conduit carried by a conduit carrier of one of the transport cups and a corresponding endcap carrier of one of the transport cups carried by an endcap carrier of the carriage.

As best shown in FIG. 5, each transport cup 12 includes a conduit 16 to receive the molten glass charge (not shown) and an endcap 18 disposed below the conduit 16 to retain the molten glass charge in the conduit 16 and to allow the molten glass charge to be discharged from the conduit 16. The conduit 16 defines an inlet 20 and an outlet 22, and further defines a passage 24, which extends between the inlet 20 and the outlet 22 along a transport cup axis $A_C$ that may extend vertically. As used herein, the term "vertically" does not necessarily mean perfectly or absolutely parallel to gravity (i.e., absolute vertical) but encompasses angular deviations of ±0-5 degrees from absolute vertical. To achieve good results for a straight drop, verticality of the axis $A_C$ is preferably about ±0.5 degrees. The conduit 16 includes an inlet end surface 26 at the inlet 20, an outlet end surface 28 at the outlet 22, and a sidewall 30 that extends between the inlet and outlet end surfaces 26, 28 and circumferentially around the conduit passage axis $A_C$. The sidewall 30 includes an outer surface 32 and an inner surface 34, which define a wall thickness of the conduit 16. The inner surface 34 defines the passage 24 and is the surface of the conduit 16 that circumferentially surrounds the molten glass charge (not shown) and through which a cooling gas flows permeably into the passage 24. In addition to cooling the conduit 16, this permeable flow of cooling gas displaces the charge away from the inner surface 34 of the conduit to create a thermal break around the charge. The inlet 20 and outlet 22 may be coaxial with, and lie in a plane perpendicular to, the conduit passage axis $A_C$, as shown in the illustrated embodiment.

The endcap 18 includes cooperating endcap halves 18a,b that slide toward and away from one other in a direction transverse to the transport cup axis $A_C$ to selectively close and open the conduit 16. To close the conduit 16, the endcap halves 18a,b are moved toward the transport cup axis $A_C$ and underneath the conduit 16 and are located closely axially adjacent to the conduit 16—this position of the endcap 18 being the closed or transport position. In this position, the endcap 18 covers or blocks the outlet 22 of the conduit 16 to axially close the passage 24 of the conduit 16 and create a holding cavity where the molten glass charge may be received through the inlet 20 and retained. To open the conduit 16, the endcap halves 18a,b are moved away from the transport cup axis $A_C$ of the conduit 16—this position of the endcap 18 being the open or dispensing position—such that the endcap halves 18a,b are laterally spaced from and do not block or cover the outlet 22 of the conduit 16, meaning that the holding cavity is no longer established and the passage 24 is once again axially unobstructed at the outlet 22. In this way, when the molten glass charge is received in the holding cavity 22, the molten glass charge can be carried by the transporter 10, and the endcap 18 can be used to selectively open the conduit 16 to permit the molten glass charge to fall through and exit the conduit 16.

The endcap halves 18a, 18b, when brought together to close the conduit 16, provide a central end surface 36 that faces the outlet end surface 28 of the conduit 16, as well as the outlet 22 of the passage 24. One or more fluid supply passages may be defined in the endcap 18 so that a gas, which is separately controlled from the cooling gas that flows permeably through the conduit 16, can be supplied through the endcap 18 and into the passage 24 of the conduit 16. Moreover, when the endcap 18 is positioned in the closed or transport position to block the outlet 22 of the conduit 16, the endcap 18 may be axially spaced from the conduit 16 to provide an exhaust gap between the outlet end surface 28 of the conduit 16 and the central end surface 36 of the endcap 18. This gap provides a fluid flow path from the passage 24 of the conduit 16 to the external environment outside of the conduit 16 when the conduit 16 is closed by the endcap 18 and, thus, functions as a fluid exhaust outlet.

With continued reference to FIG. 5, the transporter 10 may also include a conduit carrier 38 that holds the conduit 16. The conduit carrier 38 may include an outer sleeve 40 that surrounds and is radially spaced from the conduit 16 to establish a cooling chamber 42 between the outer sleeve 40 and the conduit 16 where the cooling gas may flow. The conduit carrier 38 includes opposed mounting bosses 44, 45 that may be oblong, may be coupled to the outer sleeve 40, and may cooperate with corresponding portions of the carriage 14 as will be described in further detail below. The conduit carrier 38 also includes a cooling gas inlet 46 that may extend through one of the mounting bosses 44 between fastener passages 48 thereof and through the outer sleeve 40 of the conduit carrier 38, and that may be in fluid communication with a cooling gas supply (not shown).

With reference again to FIGS. 1-5, the carriage 14 may include a carriage frame 50 to carry the transport cups 12, and a shield 52 carried by the carriage frame 50 to protect various other components of the carriage 14. The carriage frame 50 may include a base 54, which may include longitudinally spaced platforms 56a,b, beams 58a,b that may extend between and connect the platforms 56a,b, and stanchions 60 extending upwardly from the platforms 56a,b laterally between the beams 58a,b. The platforms 56a,b may be separate components as shown in the illustrated embodiment, or may be portions of a single component in other embodiments. The beams 58a,b may have vertical portions 62 with shoulders 63 (FIGS. 1 and 4) to locate against inboard portions of the platforms 56a,b and horizontal portions 64a,b extending inboard from the vertical portions 62 and overlapping the inboard portions of the platforms 58a,b.

Figure 8:
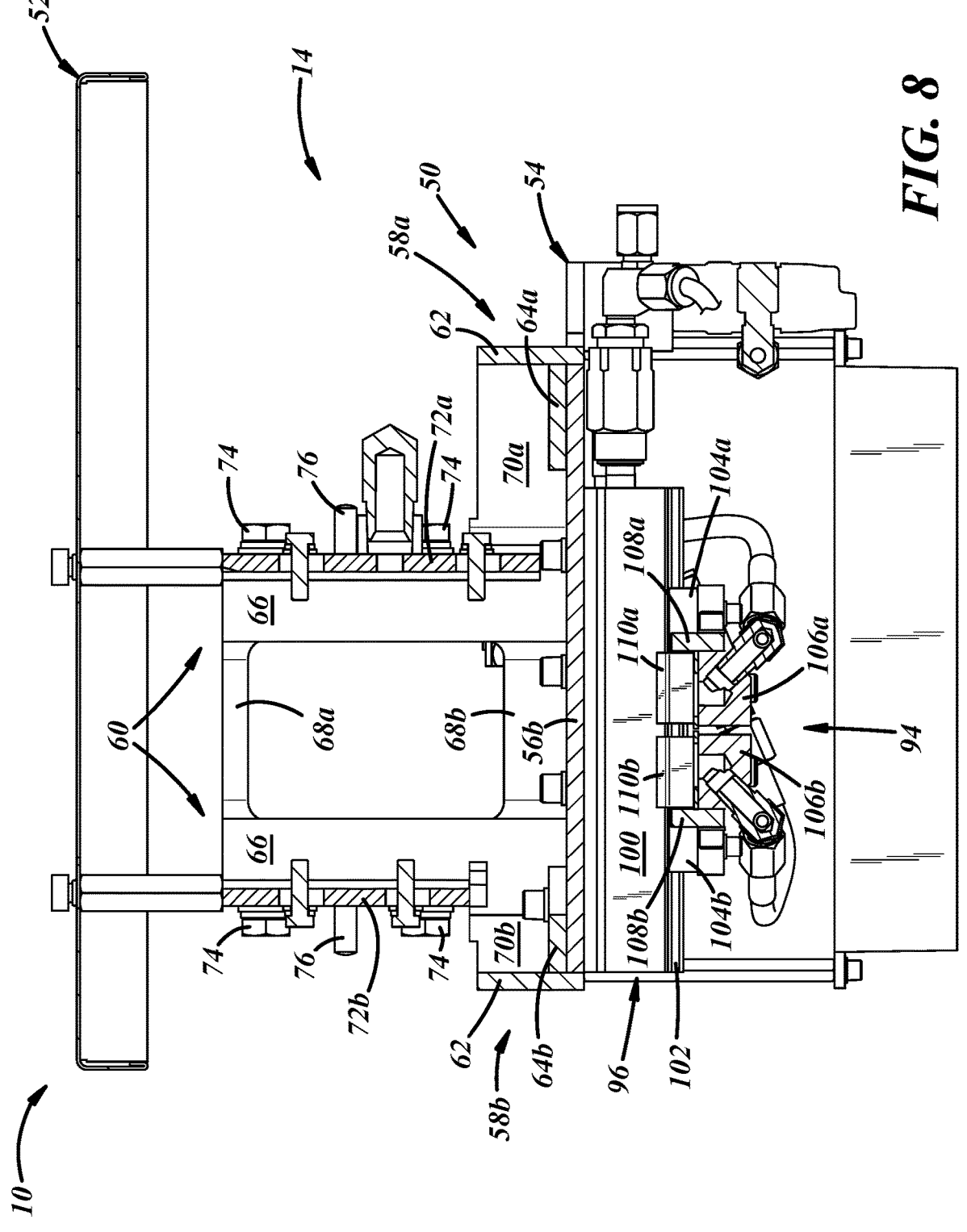
FIG. 8 is an enlarged cross-sectional end view of the molten glass transporter of FIG. 1, with the conduit carriers removed and illustrating a closed position of the endcap carrier.
Figure 9:
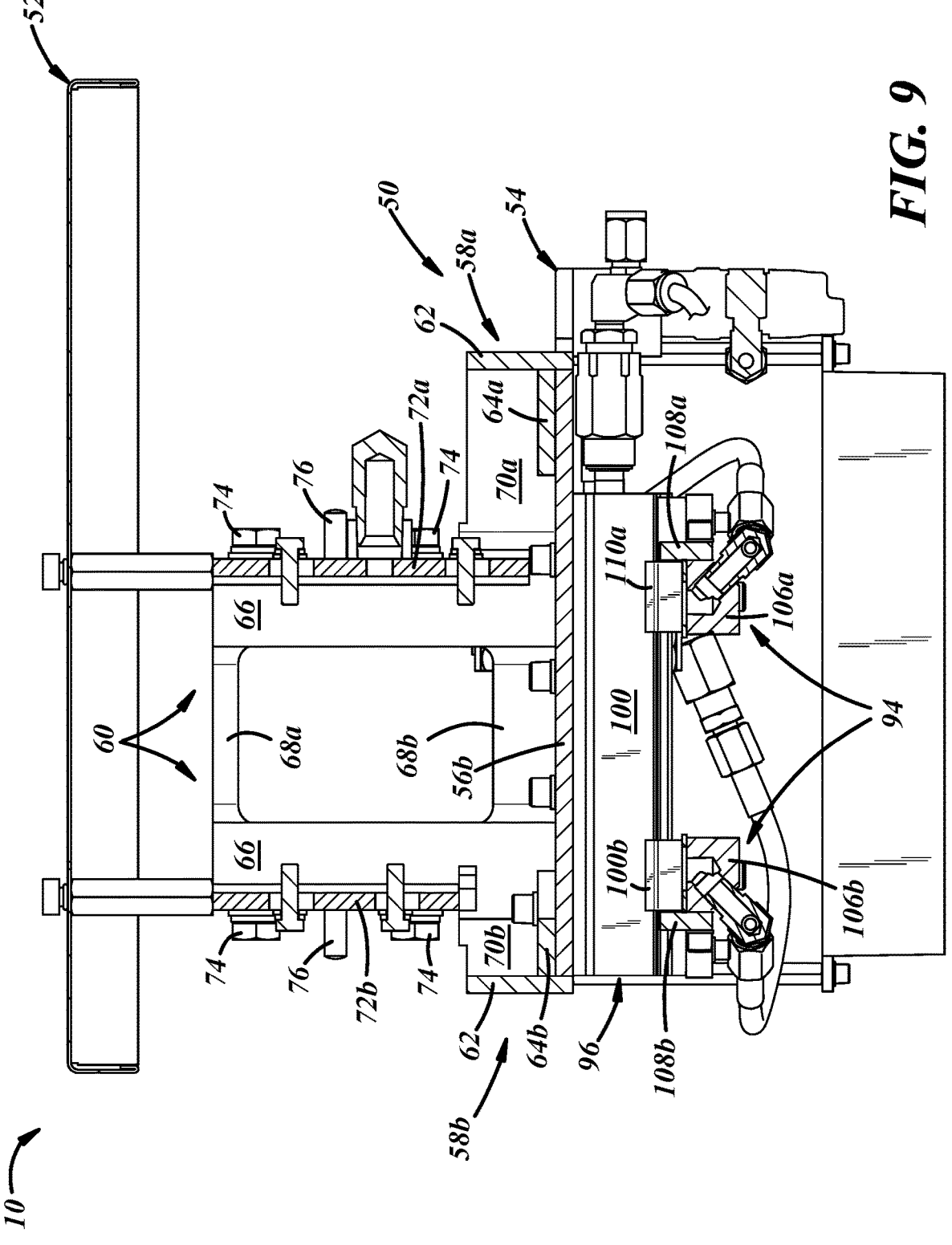
FIG. 9 is an enlarged cross-sectional end view of the molten glass transporter of FIG. 1, with the conduit carriers removed and illustrating an open position of the endcap carrier.

With reference to FIGS. 8-9, the stanchions 60 may include posts 66 and upper and lower webs 68a,b extending therebetween, and ribs 70 may extend laterally away from the posts 66 along the inboard portions of the platforms 56a,b. The base 54 may be a monolithic component, for example, a casting wherein the platforms 56a,b, beams 58a,b, posts 66, webs 68a,b, and ribs 70 are all cast together, or a weldment wherein the platforms 56a,b, beams 58a,b, posts 66, webs 68a,b, and ribs 70 are all welded together. The carriage frame 50 also may include conduit brackets 72a,b coupled to the base 54, for example, extending between and coupled to the posts 66 of the stanchions 60 of the base 54. The conduit brackets 72a,b may be monolithic components separate from the base 54 and are preferably removably coupled to the base 54, for example, by bolts 74 or any other suitable fasteners coupling longitudinal end portions of the brackets 72a,b to sides of the posts 66, which may have corresponding threaded passages for accepting the bolts 74. The posts 66 may carry dowels 76 extending outwardly therefrom and configured to extend through corresponding slots 78 (FIGS. 4-4A) in the brackets 72a,b to facilitate initial mounting of the brackets 72a,b to the carriage frame 50.

Figure 2:
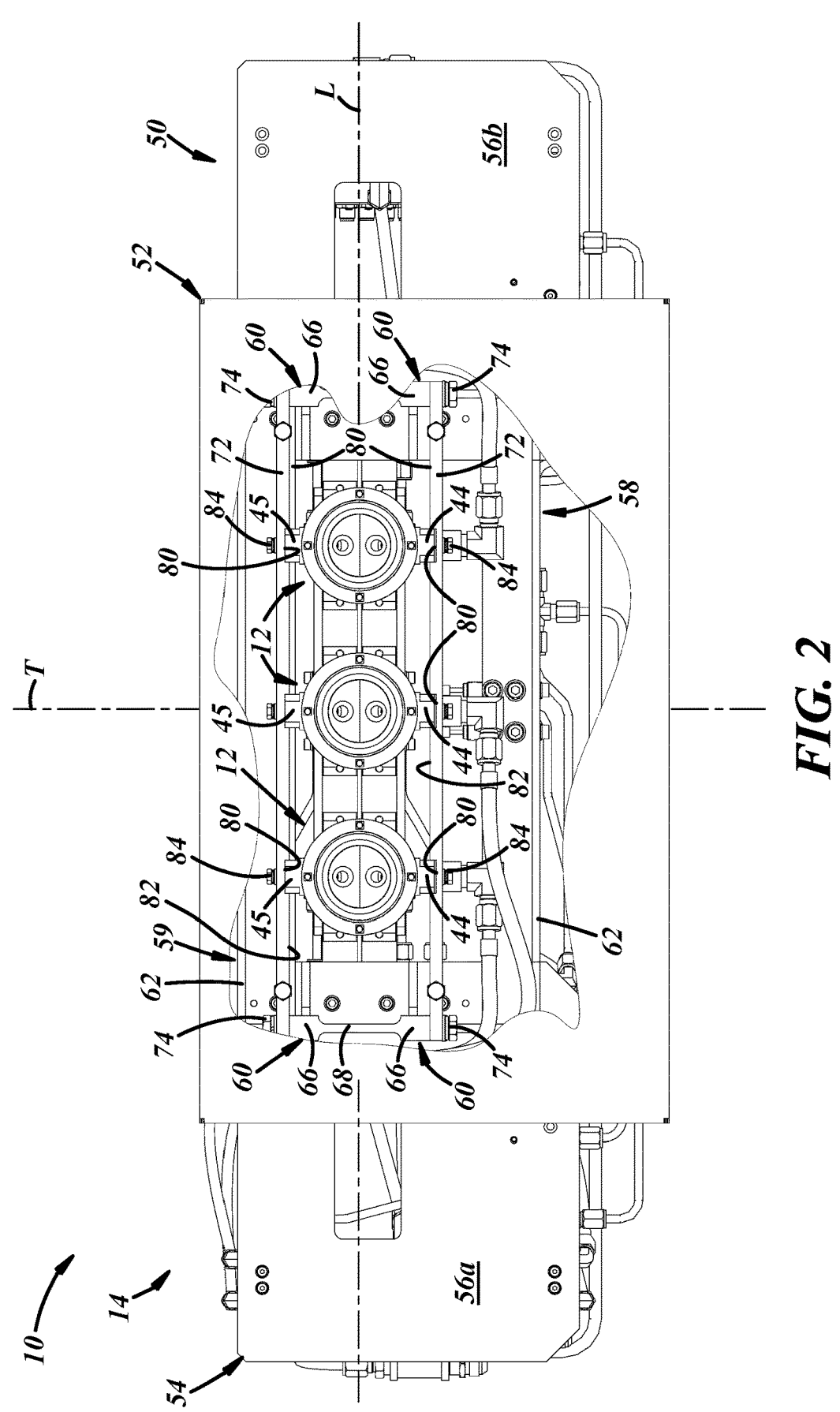
FIG. 2 is a fragmentary top view of the molten glass transporter of FIG. 1.
Figure 6:
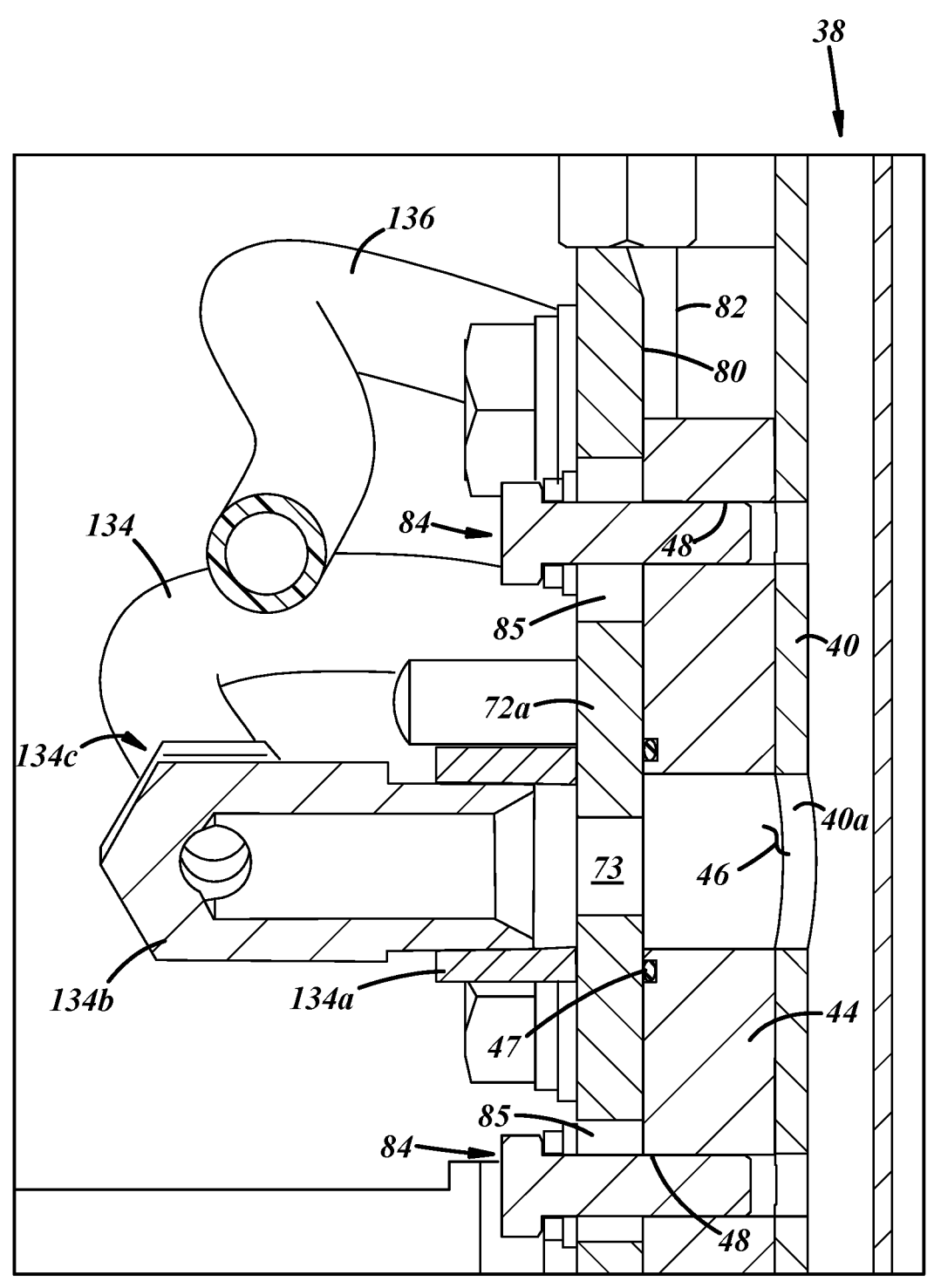
FIG. 6 is an enlarged cross-sectional view of a portion of the molten glass transporter of FIG. 1, taken from rectangle 6 of FIG. 5.

With reference to FIG. 2, the conduit brackets 72a,b support the transport cups 12. More specifically, the transport cups 12 may be vertically adjustably mounted to the conduit brackets 72a,b. For example, the mounting bosses 44, 45 of the conduit carriers 38 may fit into corresponding boss reliefs 80 in inboard surfaces 82 of the brackets 72. With reference to FIG. 6, the bosses 44, 45 may be fastened to the brackets 72a,b by conduit carrier fasteners 84 extending through vertical slots 85 in the brackets 72a,b and into the fastener passages 48 in the mounting bosses 44, 45. The conduit carriers 38 may be vertically adjustably positioned with respect to the brackets 72a,b via the vertical slots 85 and, once in desired vertical positions, may be fastened using the fasteners 84. Also, the brackets 72a,b may include fluid inlet apertures 73 in communication with the cooling gas inlet 46 and inlet aperture 40a of the conduit carrier 38 that may be sealed to the brackets 72a,b by one or more seals 47 carried in one or more corresponding grooves of the mounting bosses 44 for sealing against corresponding surfaces of the mounting brackets 72a,b.

With reference to FIG. 5, the conduit brackets 72a,b also may support the shield 52, for example, via shield fasteners 86 that may extend through a base wall 88 of the shield 52 and be threaded into top surfaces of the mounting brackets 72a,b and via shield spacers 90 that may be carried by the fasteners 86 and positioned between the brackets 72*a,b* and base wall 88 of the shield 52 to space the shield 52 away from the carriage frame 50. Of course, the base wall 88 of the shield 52 has apertures 92 corresponding to the conduit carriers 38 of the transport cups 12 to accommodate passage of the conduit carriers 38 through the shield 52 and mounting of the conduit carriers 38 to the brackets 72*a,b*. A lateral width of the shield 52 may be wider than that of the carriage frame 50 and a longitudinal length of the shield 52 may be shorter than that of the carriage frame 50. The conduit brackets 72, the conduit carriers 38, and the shield 52 constitute a sub-assembly that is removable from and applicable to the base 54 of the carriage frame 50.

Figure 3:
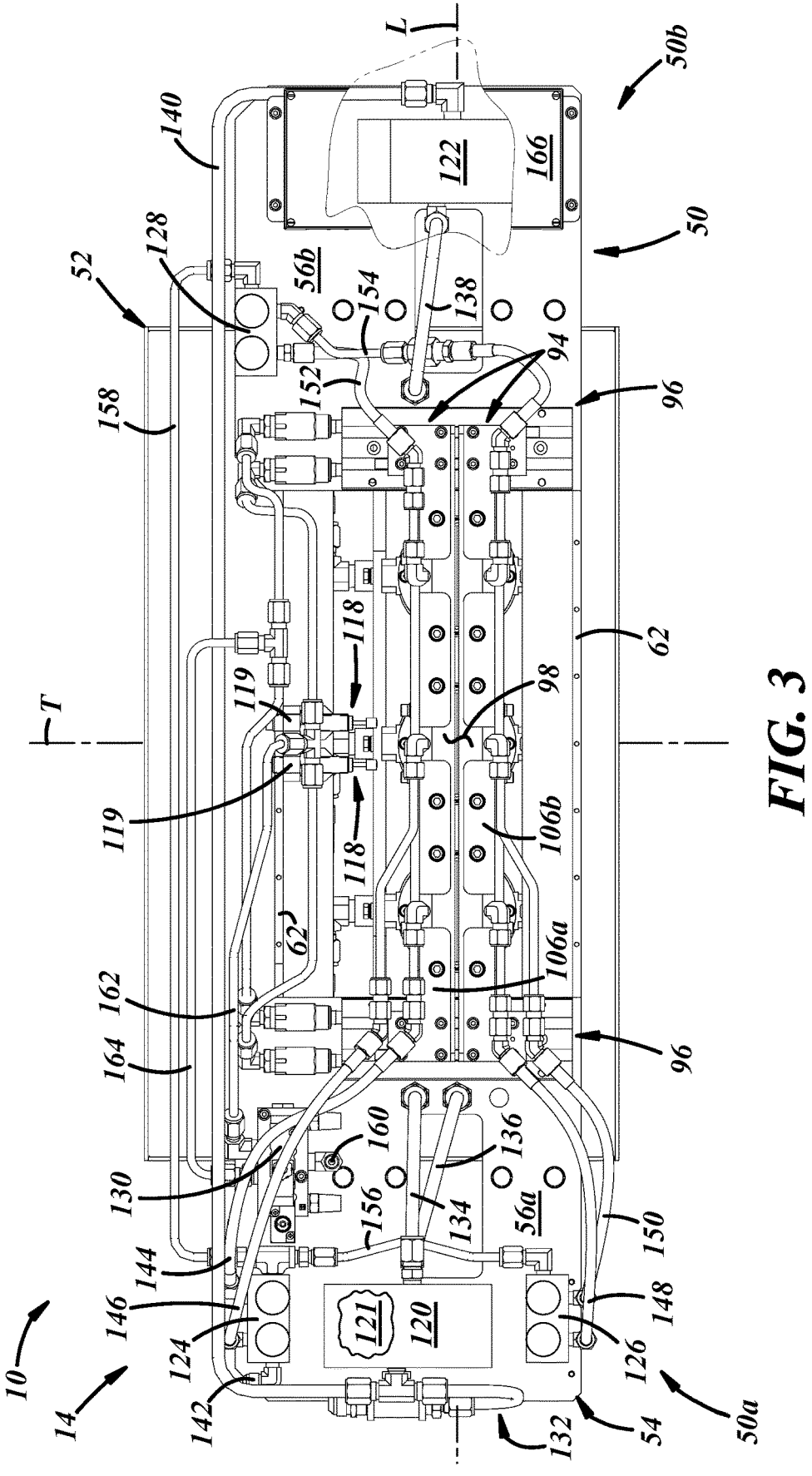
FIG. 3 is a fragmentary bottom view of the molten glass transporter of FIG. 1.

With reference to FIG. 3, the endcaps (not shown) may be carried at a lower side of the carriage frame 50, more specifically, below the base 54 of the carriage frame 50, and even more specifically, below a plane established by lower surfaces of the platforms 56*a,b* of the base 54. For example, an endcap carrier 94 may be located at the lower side of the carriage frame 50. More specifically, the endcap carrier 94 may include endcap actuators 96 operable to open and close the endcaps 18 with respect to the conduit outlets 22 (FIG. 5) and spaced longitudinally apart from one another and mounted to lower surfaces of the platforms 56*a,b* of the base 54. An endcap support 98 carrying the endcaps 18 may also be coupled to and between the endcap actuators 96. The actuators 96 may be or may include linear rodless cylinders and may be pneumatic or hydraulic, or may be or may include an electric device such as a linear motor, a rotary motor with a drive screw, a solenoid, or any other arrangement suitable to cause linear movement. The endcap carrier 94 carries the endcaps 18 and is movable to simultaneously move all of the endcaps 18 to simultaneously open and close all of the conduits 16 of the transport cups 12 (FIG. 1).

Figure 7:
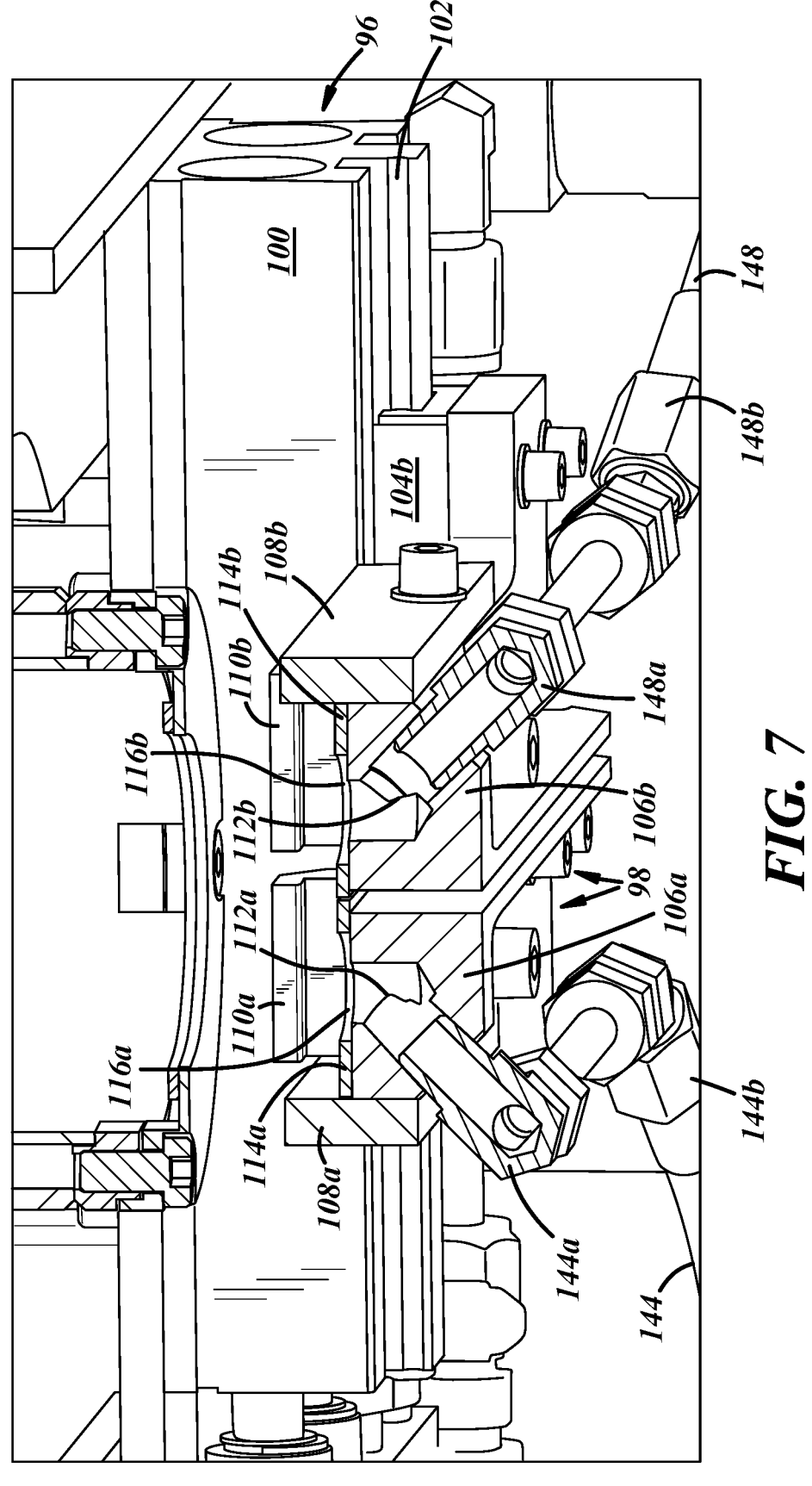
FIG. 7 is an enlarged, cross-sectional, perspective view of a lower portion of the molten glass transporter of FIG. 1, illustrating a lower end of the conduit carrier of one of the transport cups and the endcap carrier of the carriage.

With reference to FIGS. 5 and 7, each of the actuators 96 may include a fixed base 100 fastened or otherwise coupled to the frame base 54, a guide rail 102 coupled to the base 100, and translatable dual armatures 104*a,b* movably coupled to the rail 102 and actuated via the fixed base 100, and may be oriented such that an operational axis of the armatures 104*a,b* is transverse with respect to the longitudinal axis L of the carriage 14. The endcap support 98 may be coupled to the actuators 96 and may include support beams 106*a,b* extending between and fastened to corresponding armatures 104*a,b* of the actuators 96. The end cap support 98 also may include laterally spaced endcap retainer rails 108*a,b* fastened or otherwise coupled to outboard lateral sides of the endcap support beams 106*a,b* to laterally retain endcaps 18 (FIG. 5) therebetween, and longitudinally spaced endcap clamps 110*a,b* fastened or otherwise coupled onto top surfaces of the endcap support beams 106*a,b* to longitudinally and vertically clamp the endcaps to the support beams 106*a,b*. With reference to FIG. 7, the endcap support 98, more specifically, the endcap support beams 106*a,b*, include endcap fluid supply inlet ports 112 extending therethrough in locations corresponding to endcap locations. The endcap 98 support also may include endcap gaskets 114*a,b* carried on the support beams 106*a,b* between the clamps 110*a,b* and having gasket apertures 116*a,b* therethrough corresponding to the fluid supply inlet ports 112 of the endcap support beams 106*a,b*.

With reference to FIGS. 8 and 9, the actuators 96 are operable to move the armatures 104*a,b* away from and toward one another to move the endcap support beams 106*a,b* away from and toward from one another to, in turn, open and close the transport cups 12 with the endcap halves 18*a,b*. In this regard, and with reference to FIGS. 3 and 4, the carriage 14 also may include one or more opener cushions 118 that may be coupled to the carriage frame 50, for example, by cushion brackets 119 that may be fastened or otherwise coupled to the horizontal portions of the beams 106*a,b* or to any other suitable portion of the frame 50. The cushions 118 may be fixed to the cushion brackets 119 by threading, interference fit, or any other suitable fixation technique, may be configured to contact a corresponding portion of the endcap support 98, for instance, one of the retainer rails 108, when the endcap carrier 94 is moved toward its open position.

With reference now to FIG. 3, the carriage 14 also includes a plurality of fluid and electrical controls and fluid lines carried by the carriage frame 50. As used herein, the terminology "fluid line" refers to piping, tubing, fittings, couplings, adapters, and any other suitable fluid conduit. Also as used herein, the terminology "fluid control" refers to an electrically operated fluid valve or any other fluid control device suitable for use with the presently disclosed apparatus. Examples of the fluid controls and fluid are described below.

In a first example, the carriage 14 includes first and second conduit carrier fluid controls 120, 121 located at the lower side and at the first end 50*a* of the carriage frame 50 and a third conduit carrier fluid control 122 located at the lower side and at a second end 50*b* of the carriage frame 50. In a second example, the carriage 14 includes first and second endcap carrier fluid controls 124, 126 located at the lower side and the first end 50*a* of the carriage frame 50 on opposite lateral sides thereof, and a third endcap carrier fluid control 128 located at the lower side and the second end 50*b* of the carriage 14 at one lateral side thereof. In a third example, the carriage 14 includes an endcap actuator fluid control 130 located at the lower side and the first end 50*a* of the carriage 14 at first lateral side thereof.

In a fourth example, and with continued reference to FIG. 3, the carriage 14 includes a cooling supply line 132 for coupling to a first external fluid supply of cooling gas (not shown) and coupling to the first conduit carrier fluid control 120 (in the foreground) and to the second conduit carrier fluid control 121 (behind the first control 120). The carriage 14 also includes first and second cooling lines 134, 136 extending between the first and second conduit carrier fluid controls 120, 121 and corresponding first and second transport cups 12 with one cup being on one longitudinal side of the transverse axis T and another cup being on the transverse axis T, a third cooling line 138 extending between the third conduit carrier fluid control 122 and a third transport cup 12 on another longitudinal side of the transverse axis T, and a common cooling line 140 extending from the cooling supply line 132 to the third conduit carrier fluid control 122. The cooling lines 134, 136, 138 extend upwardly from the lower side of the carriage frame 50, through the corresponding platforms 56*a,b* of the base 54 of the carriage frame 50 and to the upper side of the carriage frame 50. With reference to FIG. 6, the cooling lines (134, 136 shown) may be easily connected to and disconnected from the carriage mounting brackets 72*a,b*. For example, the bracket 72 may have cooling line inlet fittings 134*a* which are in fluid communication with the inlet apertures 73 and threaded or otherwise coupled to cooling line fluid fittings 134*b*, which, in turn, may be coupled to a quick-disconnect fitting 134*c* of the cooling line 134.

In a fifth example, the carriage 14 includes an endcap supply line 142 for coupling to a second external fluid supply of the gas supplied to the endcaps (not shown) and coupling to the first endcap carrier fluid control 124, first and second endcap carrier conduits 144, 146 extending between the first endcap carrier fluid control 124 and one of the endcap support beams 106*a*, third and fourth endcap carrier conduits 148, 150 extending between the second endcap carrier fluid control 126 and the other of the endcap support beams 106*b*, and fifth and sixth carrier conduits 152, 154 extending between the third endcap carrier fluid control 128 and both of the endcap support beams 106*a,b*. The carriage 14 also includes a first common endcap fluid line 156 extending between the first and second endcap carrier fluid controls 122, 124, and a second common endcap fluid line 158 extending between the first and third endcap carrier fluid controls 122, 126.

In a sixth example, the carriage 14 includes an actuator supply line 160 for coupling to a third external fluid supply (not shown) and to the endcap actuator fluid control 130, an actuator-on fluid line 162 extending between the endcap actuator fluid control 130 and the endcap actuators 96, and an endcap actuator-off fluid line 164 extending between the endcap actuator fluid control 130 and the endcap actuators 96.

Finally, an electrical control 166 is carried at the lower side and second end 50*b* of the carriage frame 50 and, for example, may be fastened thereto with fasteners 168 and may be spaced apart therefrom by spacers 170. Although not separately shown, the electrical control 166 includes a plurality of outputs in electrical communication with individual inputs of the various aforementioned controls 120, 121, 122, 124, 126, 128, 130 to control operation thereof, and also includes a least one input in electrical communication with an external electrical supply (not shown). The electrical control 166 may include and may be operated in accordance with any suitable circuitry, program instructions, or the like to send output signals to the various controls 120, 121, 122, 124, 126, 128, 130 to control and direct a supply of fluid to the transport cups 12 and to the endcap actuators 96. The external electrical supply, and the first, second, and third external fluid supplies may be coupled to the transporter 12 as discussed below.

Figure 4:
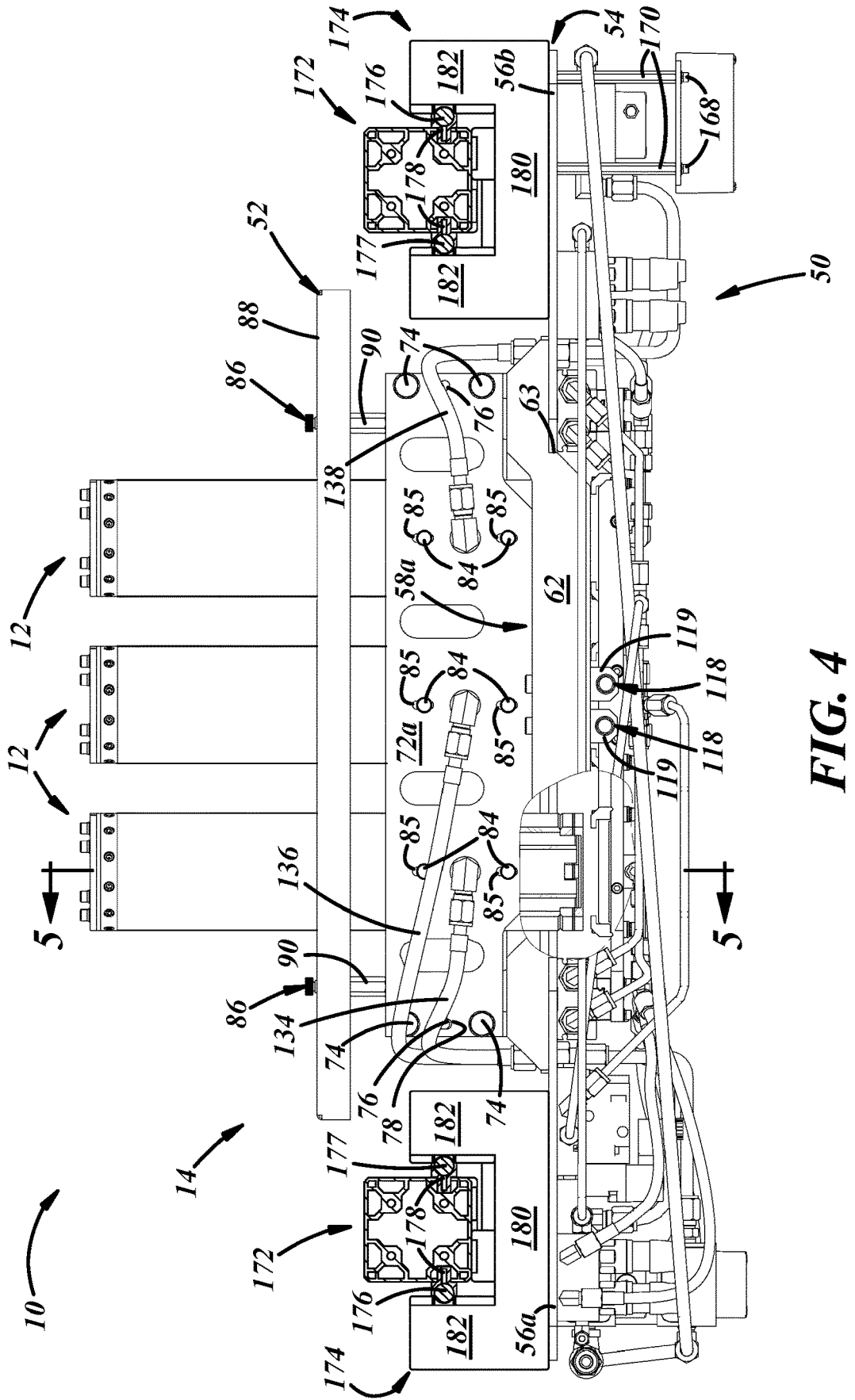
FIG. 4 is a fragmentary side view of the molten glass transporter of FIG. 1.

With reference now to FIG. 4, the transporter 12 may be coupled to a gantry, which may include rails 172 spaced laterally apart from one another and establishing a cup transport path (extending into the plane of the drawing) that may extend longitudinally over forming machines (not shown). The transporter 10 is coupled to and extends laterally between the rails 172 and is movable back and forth along the cup transport path to carry the transport cups 12. In other embodiments, the rails 172 need not be part of a gantry per se and could be stand-alone components or portions of some other material handling system. The rails 172 may be hollow rails, for example, extruded rails that may be composed of aluminum. The carriage 14 may include carriage trucks or carts 174 translatably coupled to the rails 172 as will be described in further detail below, and the carriage frame 50 may extend laterally between and be supported by the carriage carts 174, and thus the rails 172. The carriage frame 50 be fastened, welded, or otherwise coupled to the carriage carts 174 in any suitable way. In one particular embodiment, the carriage 14 may be suspended from the rails 172. For example, each of the rails 172 may include outboard and inboard guide rods 176, 177 extending longitudinally along corresponding outboard and inboard sides of the rails 172. The guide rods 176, 177 may be coupled to the rails 172 via intermediate retainers 178 that may be fastened, clipped, or otherwise coupled to the rails 172. The carriage carts 174 may include bases 180 and legs 182 extending upwardly from the bases 180 and coupled to corresponding sides of the rails 172. The bases 180 of the carriage carts 174 may be located below the rails 172 such that the carriage carts 174 may straddle the rails 172 from below the rails 172.

Figure 4A:
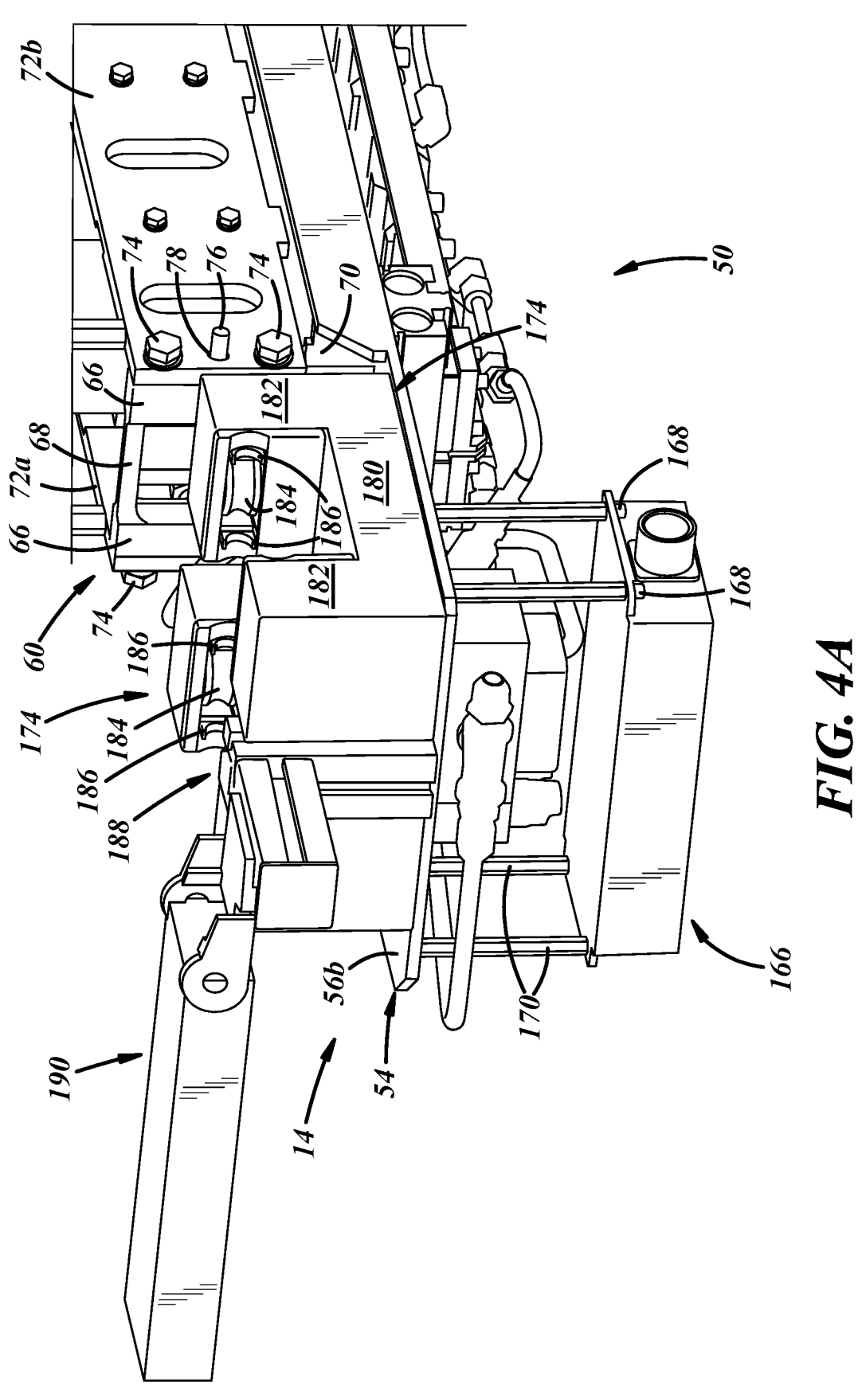
FIG. 4A is an enlarged, fragmentary, perspective view of a portion of the molten glass transporter shown in FIG. 4.

With reference to FIG. 4A, the legs 182 may rotatably carry one or more rollers 184 to rotatably ride on the guide rods 176, 177 (FIG. 4), and rod retainers 186 to facilitate retention of the carts 174 to the guide rods 176, 177. The carriage 14 also may include any suitable bracket 188 having one portion coupled to the carriage base 54, for example, between two adjacent carts 174 at one end of the carriage 14 and having another portion coupled to an end of a cable chain 190 that, although not shown, carries utilities like electrical power cables, electrical control wires, pneumatic supply hoses or tubes, and the like, that are coupled to the carriage 14 at one end and to any suitable utility couplings and supplies at another end (not shown). More specifically, the cable chain 190 may carry an electrical cable coupled at one end to the electrical supply (not shown) and at the other end to the electrical control 166, and may carry fluid lines coupled at first ends to the first, second, and third external fluid supplies (not shown) and at opposite ends to the cooling, endcap, and actuator supply lines 132, 142, 160.

FIGS. 10-14 show another illustrative embodiment of a molten glass transporter 210. This embodiment is similar in many respects to the embodiment of FIGS. 1-9 and like numerals among the embodiments generally designate like or corresponding elements throughout the several views of the drawing figures. Accordingly, the descriptions of the embodiments are incorporated into one another, and description of subject matter common to the embodiments generally may not be repeated here.

Figure 10:
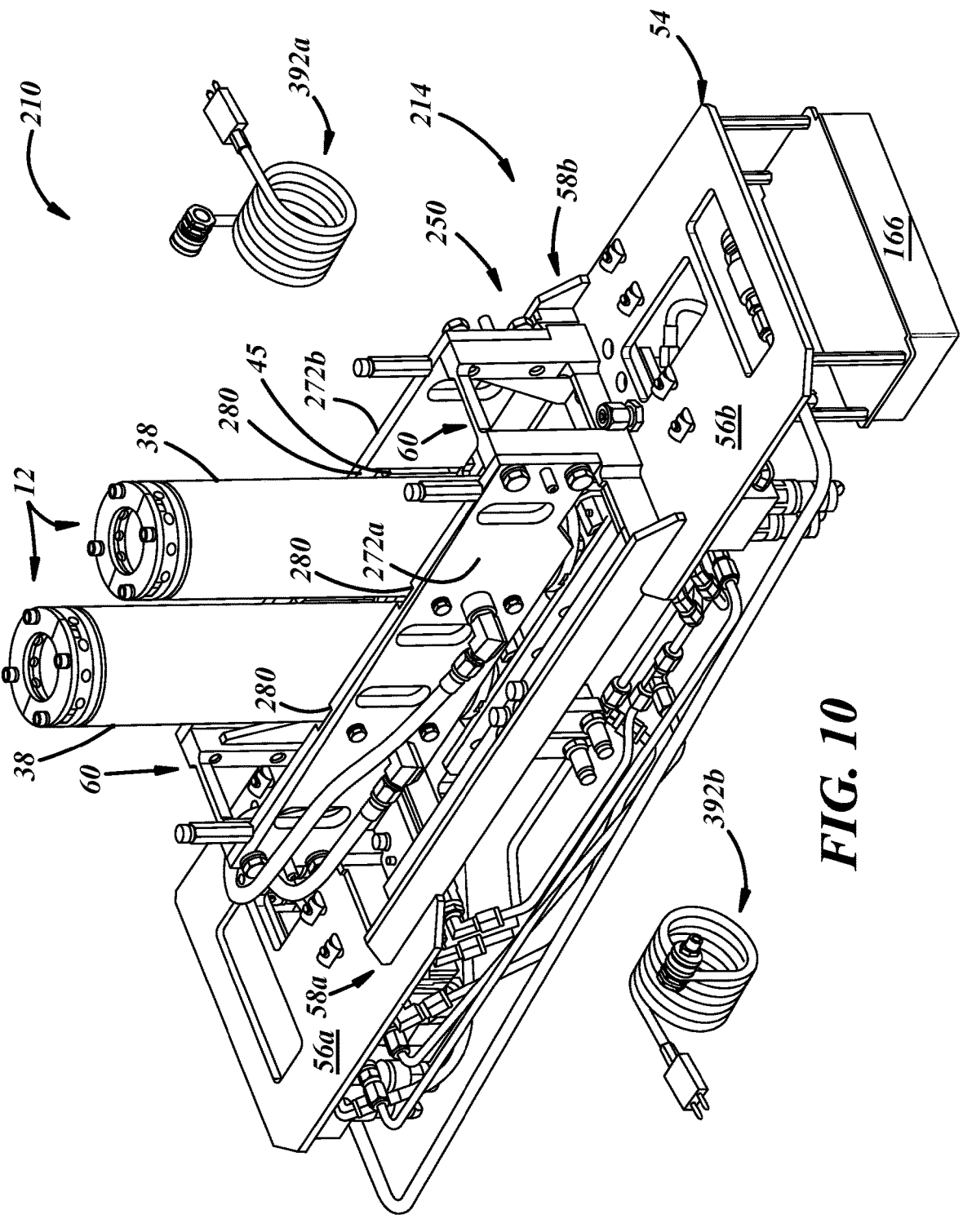
FIG. 10 is an upper perspective view of a molten glass transporter in accordance with another illustrative embodiment of the present disclosure, and illustrating a carriage frame including the carriage base of FIG. 1, and two transport cups carried by the carriage frame.
Figure 11:
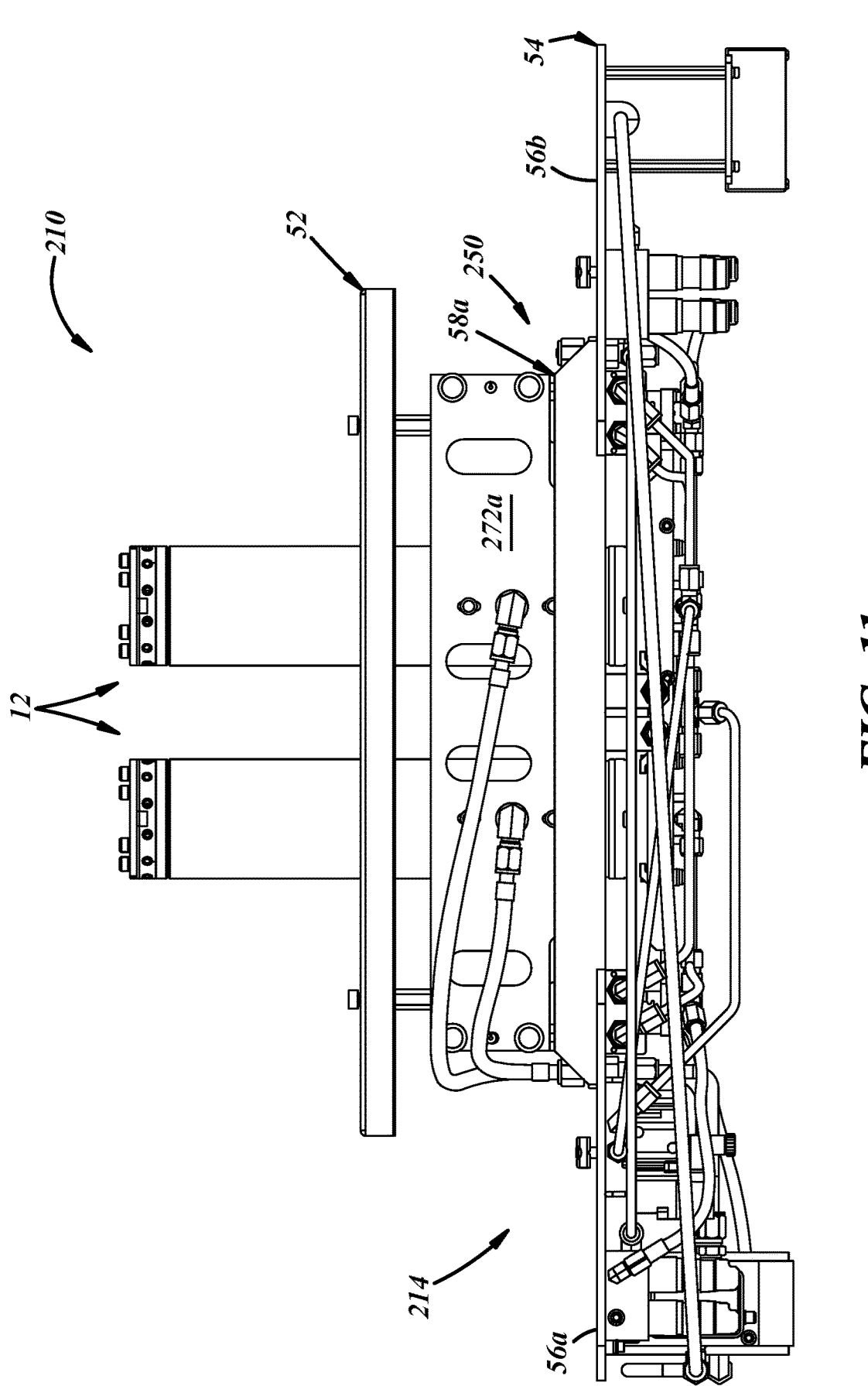
FIG. 11 is a side view of the molten glass transporter of FIG. 10.

With reference to FIGS. 10 and 11 generally, the transporter 210 is different from the transporter 10 of FIG. 1 in several respects. The transporter 210 described here includes two of the transport cups 12 and a modified carriage 214 to carry the transport cups 12. The modified carriage 214 may include a modified carriage frame 250 to carry the transport cups 12, and the shield 52 (FIG. 11) carried by the carriage frame 250. The carriage frame 250 may include the same base 54 of FIG. 1 but, to accommodate only two transport cup conduit carriers 38, the carriage frame 250 may include replacement conduit brackets 272*a,b* coupled to the base 54, for example, extending between and coupled to the stanchions 60 of the base 54. In contrast to the mounting brackets 72*a,b* of FIGS. 1-9, the replacement mounting brackets 272*a,b* shown here have two sets of mounting boss reliefs 280 to accommodate mounting bosses 44, 45 of replacement instances of conduit carriers 38 that carry replacement conduits (not shown), wherein a quantity of the replacement conduit carriers 38 and, thus, the replacement conduits are different from a quantity of the conduit carriers 38 and conduits of the transporter 10 of FIG. 1. Additionally, the transporter 210 may be used in conjunction with upper and lower gob sensors 392*a,b* to sense presence of gobs falling into the transport cups 12 and to sense presence of gobs falling out of the transport cups 12. The gob sensors 392*a,b* may be coupled to any suitable structure in any given application that is proximate to an operational envelope of the transporter 210.

Figure 12:
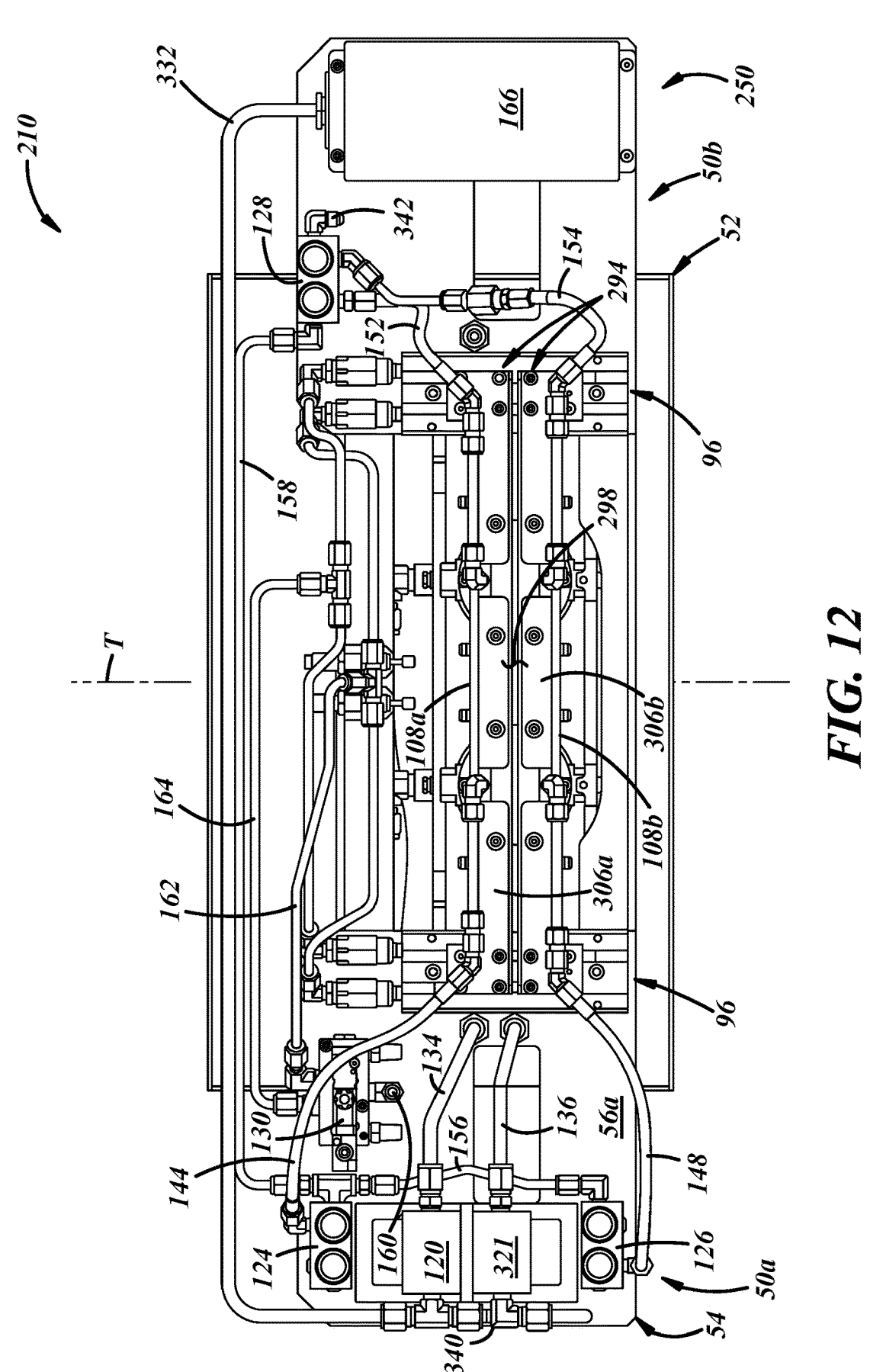
FIG. 12 is a bottom view of the molten glass transporter of FIG. 10.

Also, with reference now to FIG. 12, the carriage 214 is different with respect to an endcap carrier 294. The endcap carrier 294 still includes the actuators 96, but includes a different endcap support 298, more specifically, different support beams 306*a,b* configured to carry only two endcaps. Accordingly, instead of having three inlet ports, the support beams 306a,b have two inlet ports longitudinally spaced on either side of the transverse axis T. Otherwise, the same retainer rails 108a,b and clamps 110a,b may be used.

With continued reference to FIG. 12, the carriage 214 includes a configuration of fluid and electrical controls and fluid lines carried by the carriage frame 50 that may be different in at least some respects from the configuration of that shown in FIGS. 1-9. More specifically, in a first example, the carriage 214 includes the first conduit carrier fluid control 120 and a second conduit carrier fluid control 321 located at the lower side and at the first end 50a of the carriage frame 250. In a second example, the carriage 214 includes the first and second endcap carrier fluid controls 124, 126 located at the lower side and the first end 50a of the carriage frame 50 on opposite lateral sides thereof, and the third endcap carrier fluid control 128 located at the lower side and the second end 50b of the carriage 214 at one lateral side thereof. In a third example, the carriage 214 includes the endcap actuator fluid control 130 located at the lower side and the first end 50a of the carriage 214 at first lateral side thereof.

In a fourth example, the carriage 214 includes a cooling supply line 332 for coupling to the first external fluid supply (not shown) and extending into the first conduit carrier fluid control 120 and a common cooling line 340 extending from the first control 120 to the second conduit carrier fluid control 321, the first and second cooling lines 134, 136 extending between the first and second conduit carrier fluid controls 120, 321 and first and second transport cups 12 (FIG. 10) on opposite longitudinal sides of the transverse axis T. The cooling lines 134, 136 extend upwardly from the lower side of the carriage frame 50, through the first platform 56a of the base 54 of the carriage frame 50 and to the upper side of the carriage frame 50.

In a fifth example, the carriage 214 includes an endcap supply line 342 for coupling to the second external fluid supply (not shown), and the first and third endcap fluid lines 144, 148 extending between the first and second endcap carrier fluid controls 124, 126 and both of the endcap support beams 106a,b. The carriage 214 also includes the first common endcap fluid line 156 extending between the first and second endcap carrier fluid controls 124, 126, the second common endcap fluid line 158 extending between the second and third endcap carrier fluid controls 126, 128, and the fifth and sixth endcap fluid lines 152, 154 extending between the third endcap carrier fluid control 128 and the endcap support beams 106a,b. In a sixth example, the carriage 214 includes the endcap actuator external fluid supply line 160 for coupling to the third external fluid supply (not shown), the endcap actuator-on fluid line 162 extending between the endcap actuator fluid control 130 and the endcap actuators 96, and the endcap actuator-off fluid line 164 extending between the endcap actuator fluid control 130 and the endcap actuators 96. Finally, the electrical control 166 is carried at the lower side and second end 56b of the carriage frame 50.

Figure 13:
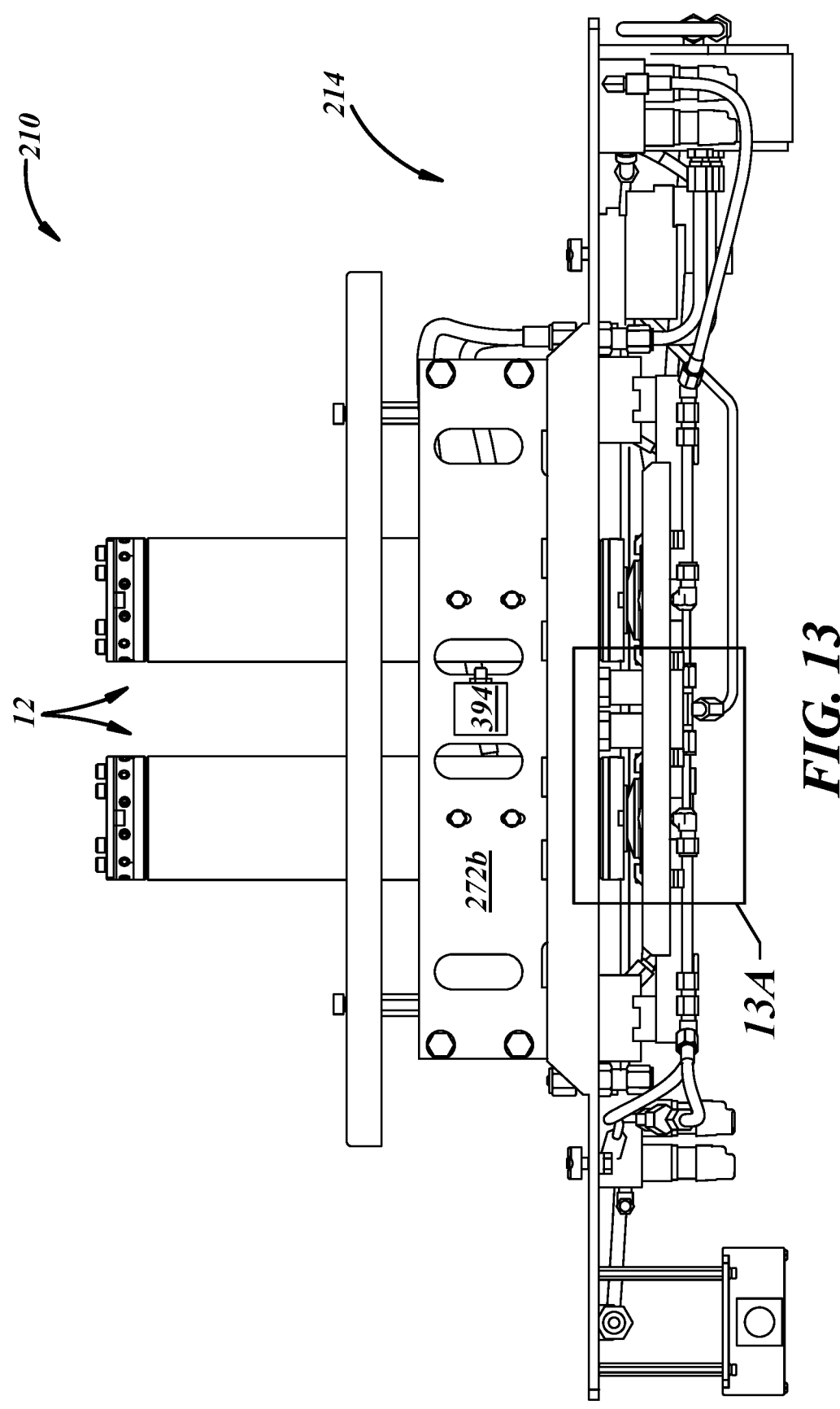
FIG. 13 is a side view of the molten glass transporter of FIG. 10, different from the side view of FIG. 11.
Figure 13A:
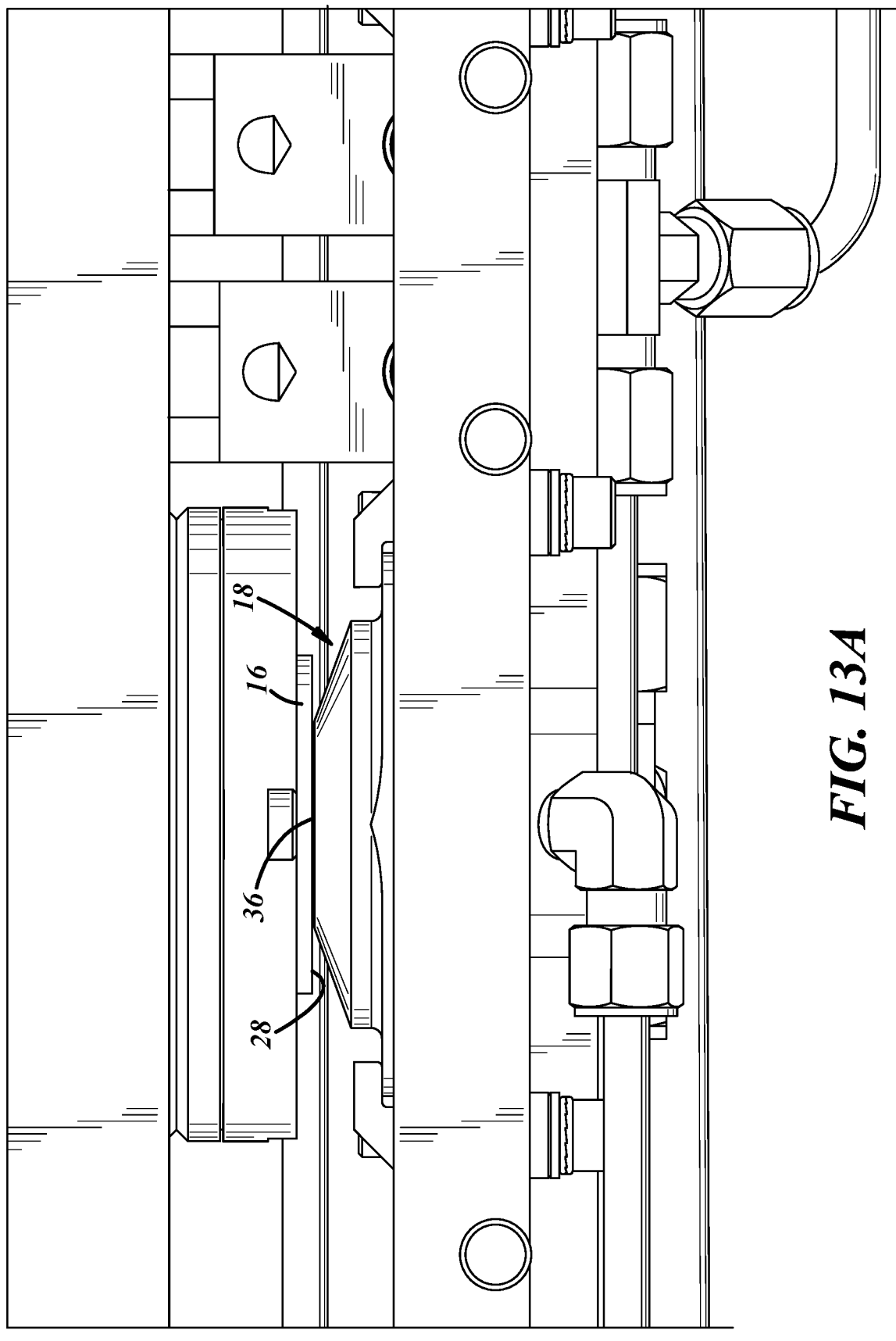
FIG. 13A is an enlarged fragmentary side view of the molten glass transporter of FIG. 10 taken from FIG. 13.
Figure 14:
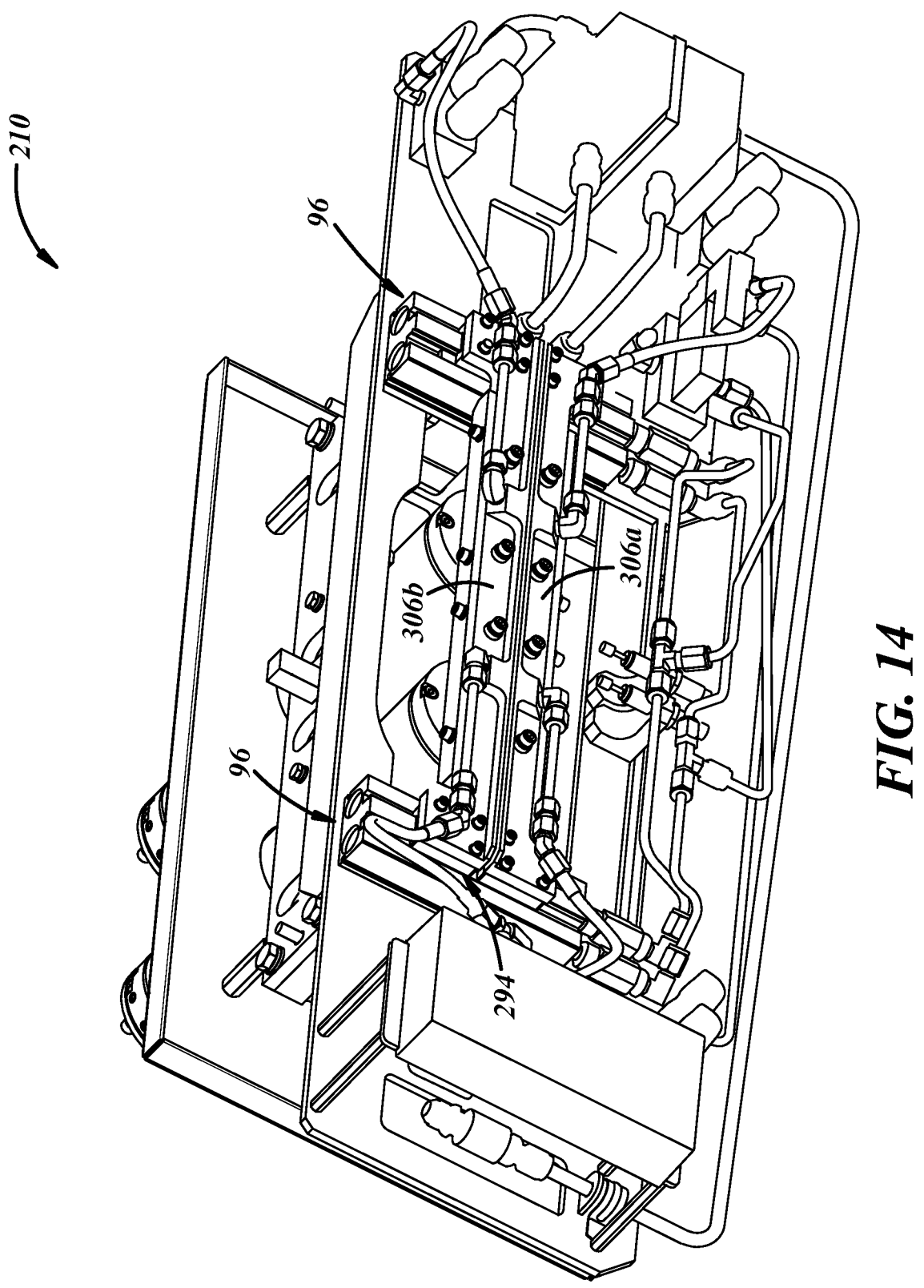
FIG. 14 is a lower perspective view of the molten glass transporter of FIG. 10, illustrating the endcap carrier in a closed position.
Figure 15:
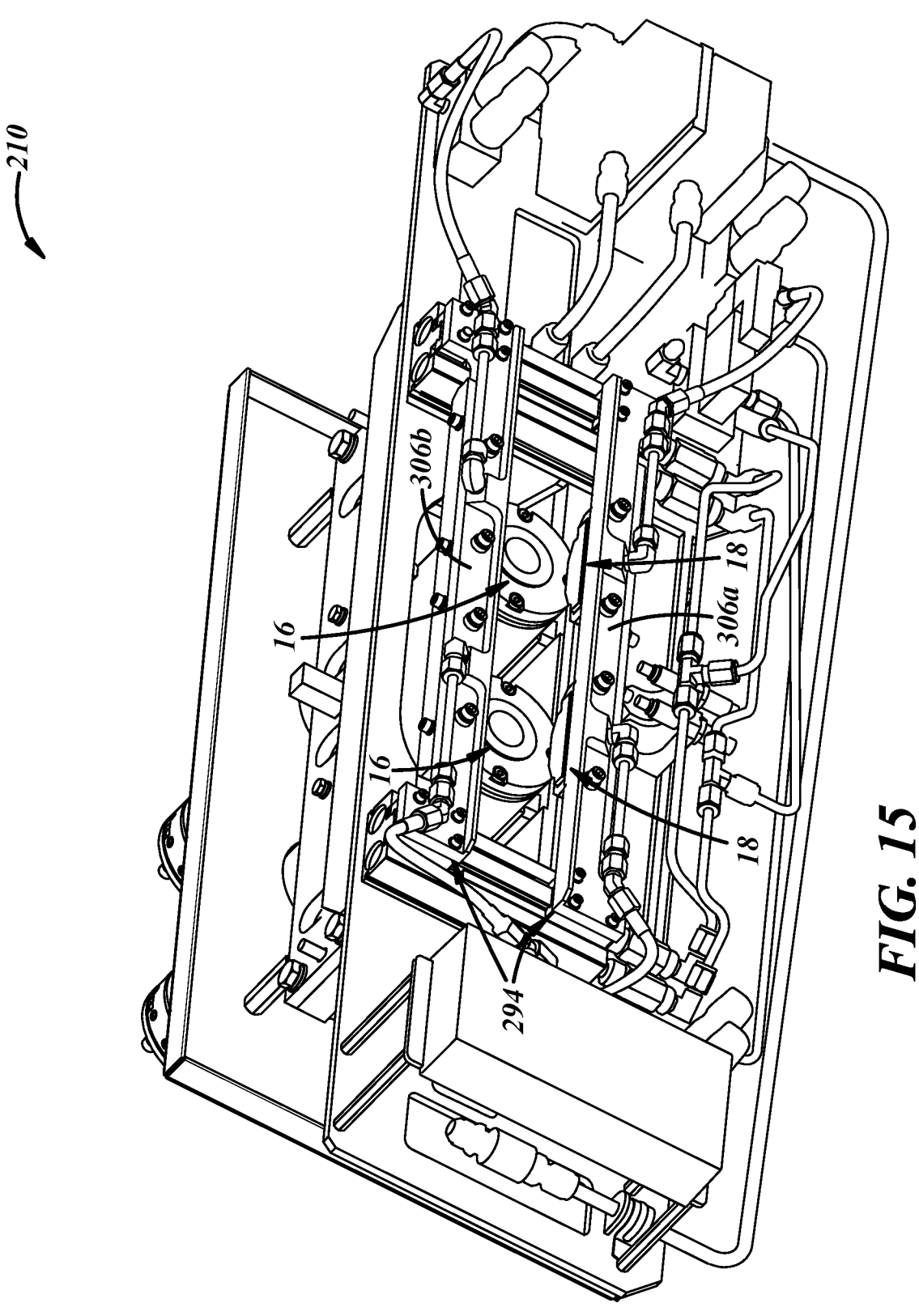
FIG. 15 is a lower perspective view of the molten glass transporter of FIG. 10, illustrating the endcap carrier in an open position.

With reference to FIG. 13, the transporter 210 may include or may be instrumented with an accelerometer 394 that may be mounted to any suitable portion of the transporters 210, for example, to the conduit bracket 272b. The accelerometer 394 may include a multi-axis accelerometer that may measure acceleration during receiving, transporting, and dispensing of the molten glass charges.

With respect to FIGS. 1 and 10, the presently disclosed transporters 10, 210 are modular in that the same carriage frame base 54, electrical control 166, and many of the fluid controls and lines can be used for carrying either three or two of the transport cups 12, as follows and in any suitable manner and sequencing. First, with reference to FIG. 3, the cooling lines 134, 136, 138 are disconnected from respective inlet fittings (134a for example) of the first bracket 72a, and the third cooling line 138 may be removed from the transporter 12 and set aside. Second, the brackets 72a,b carrying the three transporters 12 are disconnected from the carriage frame base 54 and such a transporter and bracket subassembly is set aside. Third, the endcap fluid lines 144-154 are disconnected from the endcap support 98, and the second and fourth endcap fluid lines 146, 150 may be disconnected from the transporter 12 and set aside. Fourth, the endcap support 98 with its beams 106a,b, rails 108a,b, clamps 110a,b, the three endcaps 18, and fittings (148a for example) is disconnected from the endcap actuators 96.

Figure 16:
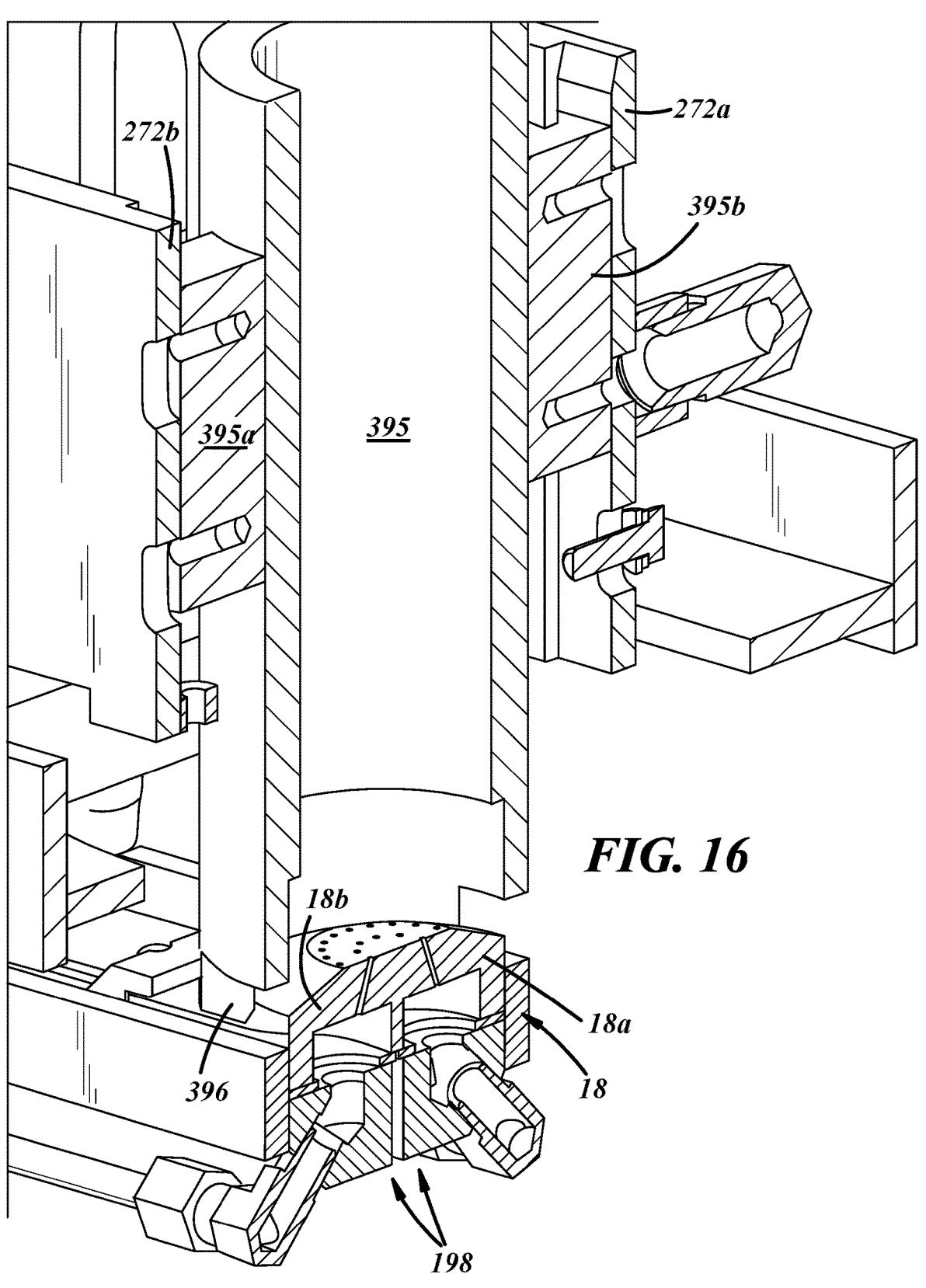
FIG. 16 is a fragmentary perspective view of a portion of the molten glass transporter of FIG. 10 and an endcap alignment tool used to align endcaps with the carriage frame.

Fifth, with reference to FIG. 12, the endcap support 298 loosely carrying two of the endcaps 18 (FIG. 5) is connected to the endcap actuators 96. Sixth, the brackets 172a,b are connected to the carriage frame base 54 by initially aligning the dowels 76 of the carriage frame base 154 into the slots 78 of the brackets 172a,b and then fastening the brackets 172a,b to the carriage frame base 54. Seventh, with reference to FIG. 16, to align the endcaps 18 with respect to the carriage frame 250 before they are fastened to the support 298, an alignment tool 395 similar in size and shape to the transporters 12 and having similar mounting bosses 395a,b for mounting to the brackets 172a,b is coupled to the brackets 172a,b and lowered with respect to each endcap 18 until a lower end 396 of the alignment tool 395 pilots around and centers each endcap 18 with respect to the alignment tool 395 at which time the clamps 110a,b are tightened to the beams 106a,b to firmly fasten the endcaps 18 in place. The alignment tool 395 may be used individually and sequentially to align each endcap 18. Eighth, the alignment tool 395 is removed and replaced with the transport cups 12 in each of the two transport cup positions, wherein the transport cups 12 are lowered with respect to the endcaps 18 until the outlet end surfaces 28 of the conduits 16 contact shims (not shown) located on the central end surfaces 36 of the endcaps 18 and then the transport cups 12 are tightly fastened to the brackets 172a,b. Ninth, with reference to FIG. 12, the cooling lines 134, 136 are connected to their respective inlet fittings (134a for example) of the bracket 172a. Tenth, the endcap fluid lines 144, 148, 152, 154 are connected to the endcap support 298.

As used in herein, the terminology "for example," "e.g.," "for instance," "like," "such as," "comprising," "having," "including," and the like, when used with a listing of one or more elements, is to be construed as open-ended, meaning that the listing does not exclude additional elements. Also, as used herein, the term "may" is an expedient merely to indicate optionality, for instance, of a disclosed embodiment, element, feature, or the like, and should not be construed as rendering indefinite any disclosure herein. Finally, the subject matter of this application is presently disclosed in conjunction with several explicit illustrative embodiments and modifications to those embodiments, using various terms. All terms used herein are intended to be merely descriptive, rather than necessarily limiting, and are to be interpreted and construed in accordance with their ordinary and customary meaning in the art, unless used in a context that requires a different interpretation. And for the sake of expedience, each explicit illustrative embodiment and modification is hereby incorporated by reference into one or more of the other explicit illustrative embodiments and modifications. The present disclosure is intended to embrace all such embodiments and modifications of the subject matter of this application, and equivalents thereto, as fall within the broad scope of the accompanying claims.

The invention claimed is:

1. A molten glass transporter, comprising:
carriage carts;
a carriage frame extending between and supported by the carriage carts, and including upper and lower sides; and
a transport cup carried by the carriage frame, and including:
    a conduit including an inlet end having an inlet and an outlet end having an outlet wherein the inlet is disposed at the upper side of the carriage frame, and
    an endcap disposed at the lower side of the carriage frame below the outlet end of the conduit.

2. The molten glass transporter of claim 1, further comprising at least one of:
one or more conduit carrier fluid controls located at the lower side of the carriage frame;
one or more endcap carrier fluid controls located at the lower side of the carriage frame;
one or more endcap actuator fluid controls located at the lower side of the carriage frame;
fluid lines located at the lower side of the carriage frame; or
electrical controls located at the lower side of the carriage frame.

3. The molten glass transporter of claim 1, further comprising:
an endcap actuator located at the lower side of the carriage frame and coupled to the endcap to open and close the endcap with respect to the outlet of the conduit.

4. The molten glass transporter of claim 1, further comprising:
a shield carried by the carriage frame at the upper side of the carriage frame and including a base wall having an aperture through which the transport cup extends.

5. The molten glass transporter of claim 4, wherein a lateral width of the shield is wider than that of the carriage frame and a longitudinal length of the shield is shorter than that of the carriage frame.

6. The molten glass transporter of claim 1, wherein the carriage frame also includes lateral sides, and longitudinal sides carrying at least one of controls or electrical controls at the lower side of the carriage frame.

7. The molten glass transporter of claim 1, wherein the carriage frame includes:
a base, and
a conduit bracket releasably coupled to the base of the carriage frame and carrying the conduit of the transport cup.

8. The molten glass transporter of claim 7, wherein the transport cup is vertically adjustably mounted to the conduit bracket.

9. The molten glass transporter of claim 8, further comprising endcap actuators carried by the base and longitudinally spaced apart from one another.

10. The molten glass transporter of claim 9, wherein the endcap includes endcap halves movable away from and toward one another to open and close the transport cup.

11. The molten glass transporter of claim 10, further comprising endcap carriers carrying the endcap halves and coupled to the endcap actuators.

12. The molten glass transporter of claim 7, wherein the conduit bracket carries a bracket fluid inlet in fluid communication with a conduit fluid inlet of the transport cup.

13. The molten glass transporter of claim 7, further comprising a shield coupled to the conduit bracket and including a shield base wall having an aperture through which the transport cup extends, wherein the conduit bracket, the conduit, and the shield constitute a sub-assembly that is removable from and applicable to the base of the carriage frame.

14. The molten glass transporter of claim 1, further comprising an endcap carrier movably coupled to the carriage frame.

15. The molten glass transporter of claim 14, wherein the endcap carrier includes an endcap fluid supply inlet port extending therethrough.

16. The molten glass transporter of claim 14, further comprising an endcap carrier cushion carried by the carriage frame and configured to cushion movement of the endcap carrier.

17. The molten glass transporter of claim 14, wherein the endcap carrier includes an endcap support beam on which the endcap is carried, a retainer rail coupled to the endcap support beam to laterally retain the endcap, and an endcap clamp coupled to the endcap support beam to clamp the endcap to the endcap support beam.

18. The molten glass transporter of claim 1, wherein the carriage carts are coupled to the carriage and carry one or more rollers.

19. The molten glass transporter of claim 18, wherein the carriage carts include bases and legs extending from the base and carrying the one or more rollers, which are configured to rotatably ride on rails.

20. A molten glass transporter, comprising:
carriage carts;
a carriage frame extending between and supported by the carriage carts, and including upper and lower sides and having:
    a base, and
    a conduit bracket releasably coupled to the base of the carriage frame; and
one or more transport cups carried by the carriage frame, and including:
    one or more conduits carried by the conduit bracket and including one or more inlet ends having one or more inlets and one or more outlet ends having one or more outlets, and
    one or more endcaps disposed at the lower side of the carriage frame below the one or more outlet ends of the one or more transport cups.

21. The molten glass transporter of claim 18, wherein the conduit bracket and the one or more transport cups are removable from the base of the carriage frame, and wherein the molten glass transporter further comprises a replacement conduit bracket configured to be releasably coupled to the base of the carriage frame and one or more replacement conduits carried by the replacement conduit bracket, wherein a quantity of the one or more replacement conduits is different from a quantity of the one or more conduits.

22. The molten glass transporter of claim 18, further comprising a shield carried by the carriage frame and including a base wall having one or more apertures through which the one or more transport cups extend, wherein the conduit bracket, the one or more conduits, and the shield constitute a sub-assembly that is removable from and applicable to the base of the carriage frame.

23. A molten glass transporter, comprising:
a carriage frame;
a plurality of transport cups carried by the carriage frame, and including:
    a plurality of conduits, and
    a plurality of endcaps disposed below the conduits; and an endcap carrier carrying the plurality of endcaps and movable to simultaneously move all endcaps of the plurality of endcaps to simultaneously open and close all transport cups of the plurality of transport cups.

24. A molten glass transporter, comprising:

a carriage frame including upper and lower sides;

a transport cup carried by the carriage frame, and including:

a conduit including an inlet end having an inlet and an outlet end having an outlet wherein the inlet is disposed at the upper side of the carriage frame, and an endcap disposed at the lower side of the carriage frame below the outlet end of the conduit; and a plurality of controls carried by the carriage frame at the lower side of the carriage frame to control supply of fluid to the endcap and to the conduit.

25. The molten glass transporter of claim 24, wherein the plurality of controls include at least one of:

one or more conduit carrier fluid controls located at the lower side of the carriage frame;

one or more endcap carrier fluid controls located at the lower side of the carriage frame;

one or more endcap actuator fluid controls located at the lower side of the carriage frame; or electrical controls located at the lower side of the carriage frame.

26. A method of transporting molten glass, comprising:

providing a molten glass transporter including carriage carts, a carriage frame extending between and supported by the carriage carts and including upper and lower sides, and a plurality of transport cups carried by the carriage frame and having a plurality of conduits including inlet ends having inlets and outlet ends having outlets wherein the inlets are disposed at the upper side of the carriage frame, and a plurality of endcaps below the plurality of conduits and disposed at the lower side of the carriage frame below the outlet end of the conduits;

removing the plurality of endcaps from the carriage frame and replacing the plurality of endcaps with a plurality of replacement endcaps having a quantity different than that of the plurality of endcaps; and removing the plurality of conduits from the carriage frame and replacing the plurality of conduits with a plurality of replacement conduits having a quantity different than that of the plurality of conduits.

27. The method of claim 26, further comprising:

coupling an endcap alignment tool to the carriage frame to align the plurality of endcaps with respect to the carriage frame before replacing the plurality of conduits with the plurality of replacement conduits.

* * * * *